US008934061B1

(12) United States Patent
Wengreen et al.

(10) Patent No.: US 8,934,061 B1
(45) Date of Patent: *Jan. 13, 2015

(54) MOUNTING SYSTEMS FOR DIGITAL MEDIA PLAYERS

(71) Applicant: Innovelis, Inc., Sammamish, WA (US)

(72) Inventors: Eric John Wengreen, Sammamish, WA (US); Brian Jeffrey Wengreen, Ravensdale, WA (US); Wesley Edward Schwie, Philadelphia, PA (US)

(73) Assignee: Innovelis, Inc., Sammamish, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,070

(22) Filed: Sep. 10, 2014

Related U.S. Application Data

(63) Continuation of application No. 13/781,717, filed on Feb. 28, 2013, and a continuation of application No. 13/779,733, filed on Feb. 27, 2013, and a continuation-in-part of application No. 13/332,373, filed on Dec. 21, 2011, which is a continuation-in-part of application No. 13/278,759, filed on Oct. 21, 2011, now abandoned, application No. 14/482,070, which is a continuation of application No. 14/480,830, filed on Sep. 9, 2014, which is a continuation of application No. 13/779,733, filed on Feb. 27, 2013.

(60) Provisional application No. 61/416,736, filed on Nov. 23, 2010.

(51) Int. Cl.
*H04N 5/64* (2006.01)
*H04N 5/655* (2006.01)
*G06F 1/16* (2006.01)

(52) U.S. Cl.
CPC .............. *H04N 5/655* (2013.01); *G06F 1/1607* (2013.01); *G06F 1/1605* (2013.01); *H04N 5/64* (2013.01)
USPC ......................................................... 348/836

(58) Field of Classification Search
CPC ............ H04N 5/64; H04N 5/655; G06F 1/16; G06F 1/1601
USPC .................................................. 348/836, 846
See application file for complete search history.

(56) References Cited

U.S. PATENT DOCUMENTS

| 1,618,573 A | 2/1927 | Cole |
| 2,584,646 A | 2/1952 | Wagstaff |

(Continued)

OTHER PUBLICATIONS

Out of Sight Bracket—Website Part 1 (downloaded on Nov. 13, 2013 from http://www.outofsightbracket.com/OutOfSightBracket/Out_of_Sight_Bracket_for_Apple_TV.html). The website says the Out of Sight Bracket is "Patent Pending." the Out of Sight Bracket might have been made by Gordon H. Beckhart.

(Continued)

*Primary Examiner* — Geepy Pe

(57) ABSTRACT

Mounting systems can allow users to couple a digital media player to a display screen. Some mount embodiments position the digital media player over the display screen. In several embodiments, the digital media player is positioned approximately horizontally such that the digital media player is oriented approximately parallel to the floor of the room while an arm supports the digital media player over the display screen.

30 Claims, 31 Drawing Sheets

(56) References Cited

U.S. PATENT DOCUMENTS

| | | | |
|---|---|---|---|
| 3,091,378 | A | 5/1963 | O'Dwyer |
| 3,176,950 | A | 4/1965 | Hittesdorf |
| 3,279,009 | A | 10/1966 | Teasdale |
| 3,294,298 | A | 12/1966 | Danielson |
| 3,477,679 | A | 11/1969 | Lovitz |
| 3,990,617 | A | 11/1976 | Carter |
| 4,519,656 | A | 5/1985 | Raz |
| 4,602,761 | A | 7/1986 | Carter |
| 4,697,780 | A | 10/1987 | Wenkman |
| 4,746,042 | A | 5/1988 | King |
| 4,771,927 | A | 9/1988 | Ventura |
| 4,825,590 | A | 5/1989 | Cullinane |
| 4,826,115 | A | 5/1989 | Novitski |
| 4,840,773 | A | 6/1989 | Wade |
| 4,852,843 | A | 8/1989 | Chandler |
| 4,974,764 | A | 12/1990 | Cantwell |
| 5,038,985 | A | 8/1991 | Chapin |
| 5,092,395 | A | 3/1992 | Amidzich |
| 5,273,690 | A | 12/1993 | McDowell |
| 5,297,318 | A | 3/1994 | Adolphson |
| D351,341 | S | 10/1994 | Hung |
| 5,400,990 | A | 3/1995 | Frankel |
| 5,535,093 | A | 7/1996 | Noguchi |
| 5,593,124 | A | 1/1997 | Wang |
| 5,619,395 | A | 4/1997 | McBride |
| 5,619,774 | A | 4/1997 | Perry |
| D388,107 | S | 12/1997 | Huckins |
| 5,850,998 | A | 12/1998 | Parsey |
| 5,899,371 | A | 5/1999 | Weliver |
| 5,914,707 | A | 6/1999 | Kono |
| 5,961,083 | A | 10/1999 | Hartman |
| 5,979,724 | A | 11/1999 | Loewenthal |
| 6,102,660 | A | 8/2000 | Lee |
| 6,105,923 | A | 8/2000 | Robertson |
| D443,493 | S | 6/2001 | Skeem |
| 6,275,885 | B1 | 8/2001 | Chin |
| 6,336,615 | B1 | 1/2002 | Jeon |
| D456,413 | S | 4/2002 | Malson |
| 6,485,144 | B1 | 11/2002 | Liao |
| 6,560,983 | B1 | 5/2003 | Schimmeyer |
| 6,691,374 | B2 | 2/2004 | Coyne |
| 6,888,940 | B1 | 5/2005 | Deppen |
| 6,939,641 | B2 | 9/2005 | Kincaid |
| 7,047,601 | B1 | 5/2006 | Vernon-Woods |
| 7,079,384 | B2 | 7/2006 | Wang |
| 7,113,218 | B2 | 9/2006 | Battles |
| 7,145,603 | B2 | 12/2006 | Whitby |
| D535,826 | S | 1/2007 | Toghanian |
| 7,222,762 | B2 | 5/2007 | Rees |
| D545,343 | S | 6/2007 | Braun |
| D560,411 | S | 1/2008 | Chung |
| D565,399 | S | 4/2008 | Grey |
| 7,367,089 | B2 | 5/2008 | Cooke |
| D570,801 | S | 6/2008 | Allen |
| D598,945 | S | 8/2009 | Gillespie |
| 7,580,255 | B2 | 8/2009 | Crooijmans |
| D624,949 | S | 10/2010 | Nakayama |
| D625,729 | S | 10/2010 | McNames |
| D628,611 | S | 12/2010 | Lewis |
| 7,854,420 | B2 | 12/2010 | Depay |
| D633,503 | S | 3/2011 | Bo |
| 7,959,121 | B1 | 6/2011 | Barnes |
| D657,362 | S | 4/2012 | Lister |
| D662,491 | S | 6/2012 | Andre |
| D667,411 | S | 9/2012 | Kim |
| 8,544,805 | B2 | 10/2013 | Virgin |
| 2005/0236541 | A1 | 10/2005 | Chang |
| 2007/0264169 | A1 | 11/2007 | Chen |
| 2008/0078793 | A1 | 4/2008 | Brown |
| 2009/0218454 | A1 | 9/2009 | Stanley |
| 2010/0288895 | A1 | 11/2010 | Shamie |
| 2010/0314277 | A1 | 12/2010 | Murray |
| 2012/0126081 | A1 | 5/2012 | Wengreen |
| 2012/0127379 | A1 | 5/2012 | Wengreen |

OTHER PUBLICATIONS

Out of Sight Bracket—Website Part 2 (downloaded on Nov. 13, 2013 from http://www.outofsightbracket.com/OutOfSightBracket/How_to_mount_your_Apple_TV_or_AirPort_Express.html). The website says the Out of Sight Bracket is "Patent Pending." The Out of Sight Bracket might have been made by Gordon H. Beckhart.

Out of Sight Bracket—Website Part 3 (downloaded on Nov. 13, 2013 from http://www.soundandvision.com/content/bracket-keeps-apple-airport-express-and-apple-tv-out-sight).

TV Tray—Website (downloaded on Nov. 13, 2013 from http://h-sq.com/products/tvtray/).

TV Tray—Installation Guide (downloaded on Nov. 13, 2013 from http://www.h-sq.com/downloads/tvtx_ug.pdf).

Cosmos Tray—Website (downloaded on Nov. 13, 2013 from http://www.amazon.com/Cosmos-MD199LL-AirPort-Express-Station/dp/B00C2JNGB2/ref=sr_1_4?ie=UTF8&qid=1384406376&sr=8-4&keywords=apple+tv+mount).

CTA Digital—Website (downloaded on Nov. 13, 2013 from http://www.ctadigital.com/downloads/KIN-WMC-final.pdf).

PDP Mounting Clip—Part 1 (downloaded on Nov. 13, 2013 from http://www.amazon.com/Kinect-Sensor-TV-Mounting-Clip-Xbox/dp/B004XV6ST4).

PDP Mounting Clip—Part 2 (downloaded on Nov. 13, 2013 from http://www.microsoftstore.com/store/msusa/en_US/pdp/Kinect-Sensor-TV-Mounting-Clip/productID.253726200).

PDP Mounting Clip—Part 3 (downloaded on Nov. 13, 2013 from http://www.bestbuy.com/site/pdp-sensor-mounting-clip-for-kinect/3521258.p?id=1218408957863&skuId=3521258).

ScreenDeck (downloaded on Nov. 13, 2013 from http://news.cnet.com/8301-17938_105-20071226-1/screendeck-adds-top-shelf-to-your-flat-panel-tv/).

Center Stage Bracket—Part 1 (downloaded on Nov. 13, 2013 from http://www.bestbuy.com/site/center-stage-bracket-satellite-center-channel-speaker-shelf-bracket-black/5857191.p?id=1218697292805&skuId=5857191).

Center Stage Bracket—Part 2 (downloaded on Nov. 13, 2013 from http://www.bestbuy.com/site/center-stage-bracket-satellite-center-channel-speaker-shelf-bracket-black/5857191.p?id=1218697292805&skuId=5857191).

DreamGear TriMount (downloaded on Nov. 14, 2013 from http://www.dreamgear.net/shop-by-platform/universal/trimount.html).

Cisco router wall mounting instructions (downloaded on Jan. 2, 2014 from http://www.cisco.com/en/US/docs/routers/access/1800/1841/hardware/installation/guide/18inst.pdf).

Cisco wall mounting bracket (downloaded on Jan. 2, 2014 from http://www.cisco.com/en/US/docs/routers/access/800/806/hardware/installation/guide/install.pdf).

Netgear ProSafe (downloaded on Jan. 2, 2014 from http://www.storagereview.com/netgear_prosafe_wndap660_dualband_wireless_access_point_review) article includes a date of Dec. 21, 2012.

Wireless router picture (downloaded on Jan. 2, 2014 from http://www.techwarelabs.com/wp-content/gallery/engenius-esr9850-wireless-router/router-bottom.jpg).

Apple TV, downloaded on Feb. 3, 2014 from http://www.apple.com/appletv/what-is/.

Roku media players—Part 1, downloaded on Feb. 3, 2014 from http://www.roku.com/products/roku-2.

Roku media players—Part 2, downloaded on Feb. 3, 2014 from http://www.roku.com/products/compare.

Innovelis, Inc. Product—TotalMount—Apple TV Mounting Kit, downloaded from Amazon.com on Feb. 3, 2014, first available on Amazon.com on Jun. 22, 2011: http://www.amazon.com/TotalMount-Apple-Universal-Mounting-Kit/dp/B0057CVH6W/ref=sr_1_1?ie=UTF8&qid=1391473446&sr=8-1&keywords=TOTALMOUNT.

Innovelis, Inc. Product—TotalMount—Roku Mounting Kit, downloaded from Amazon.com on Feb. 3, 2014, first available on Amazon.com on Jun. 14, 2012: http://www.amazon.com/TotalMount-ROKU-UNIVERSAL-MOUNTING-Compatible/dp/B008B1125W/ref=sr_1_2?ie=UTF8&qid=1391473922&sr=8-2&keywords=totalmount.

Innovelis, Inc. Product—TotalMount—Remote Holder, downloaded from Amazon.com on Feb. 3, 2014, first available on Amazon.com on

(56) References Cited

OTHER PUBLICATIONS

Jul. 2, 2013: http://www.amazon.com/Apple-TV-Remote-Holder-TotalMount/dp/B00DR76YJO/ref=sr_1_3?ie=UTF8&qid=1391474218&sr=8-3&keywords=totalmount.

Innovelis, Inc. Product—TotalMount—AirPort Express Mounting Kit, downloaded from Amazon.com on Feb. 3, 2014, first available on Amazon.com in approximately Sep. 2012: http://www.amazon.com/TotalMount-AirPort-Express-Mounting-Kit/dp/B009HC7BL8/ref=sr_1_4?ie=UTF8&qid=1391474218&sr=8-4&keywords=totalmount.

Innovelis, Inc. Product—TotalMount—Roku Mounting Kit (Version 1), downloaded from Amazon.com on Feb. 3, 2014, first available on Amazon.com on Jan. 19, 2012: http://www.amazon.com/TotalMount-ROKU-MOUNTING-Compatible-Roku/dp/B006ZS4R46/ref=sr_1_5?ie=UTF8&qid=1391474218&sr=8-5&keywords=totalmount.

Innovelis, Inc. Product—TotalMount—AirPort Extreme Mounting Kit, downloaded from Amazon.com on Feb. 3, 2014, first available on Amazon.com in approximately Apr. 2013: http://www.amazon.com/TotalMount-Compatible-generations-compatible-generation/dp/B00CK2CDLK/ref=sr_1_7ie=UTF8&qid=1391474218&sr=8-7&keywords=totalmount.

Innovelis, Inc. Product—TotalMount—Vizio Mounting Kit, downloaded from Amazon.com on Feb. 3, 2014, first available on Amazon.com in approximately May 2013: http://www.amazon.com/TotalMount-VIZIO-Co-Star-Mounting-Kit/dp/B00GDMXSZ8/ref=sr_1_10?ie=UTF8&qid=1391474218&sr=8-10&keywords=totalmount.

Amazon Fire TV, downloaded on Jun. 2, 2014 from http://www.amazon.com/Fire-TV-streaming-media-player/dp/B00CX5P8FC.

Logitech HD Pro Webcam C910, downloaded on Oct. 9, 2014 from http://www.amazon.com/Logitech-Webcam-C910-1080p-Video/dp/B003M2YT96/ref=sr_1_6?ie=UTF8&qid=1287528024&sr=8-6.

HP KQ246AA 8.0 MP Deluxe Webcam, downloaded on Oct. 9, 2014 from http://www.amazon.com/HP-KQ246AA-8-0-Deluxe-Webcam/dp/B001D8AGA2/ref=sr_1_4?ie=UTF8&qid=1410543707&sr=8-4&keywords=hp+webcam.

Logitech Webcam C200, downloaded on Oct. 9, 2014 from http://www.amazon.com/Logitech-960-000415-Webcam-C200/dp/B002GP7ZTQ/ref=pd_cp_pc_0.

USB 6 LED PC Webcam, downloaded on Oct. 9, 2014 from http://www.amazon.com/Webcam-Camera-Night-Vision-Meeting/dp/B00MTGV4F8/ref=sr_1_88?s=electronics&ie=UTF8&qid=1410543946&sr=1-88&keywords=webcam+clamp.

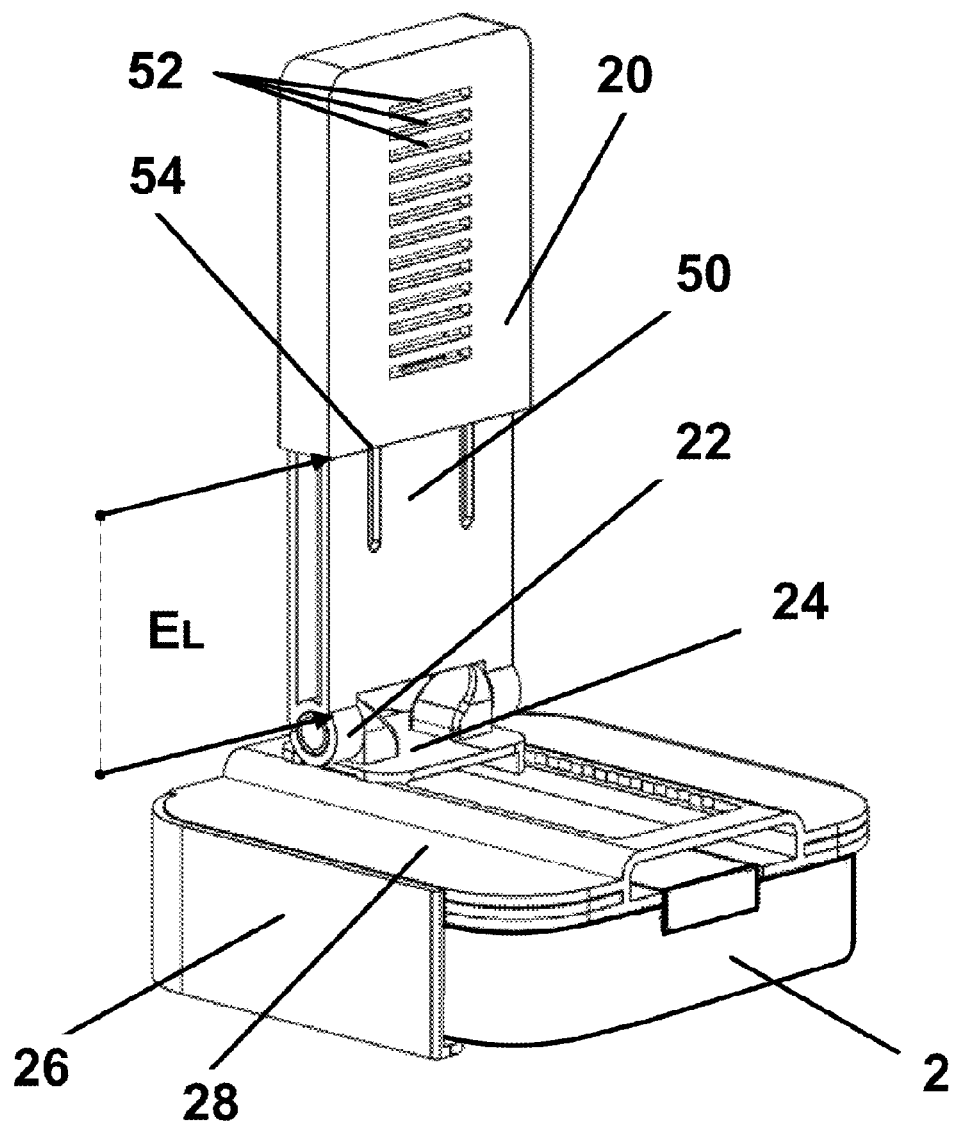
FIG. 4C
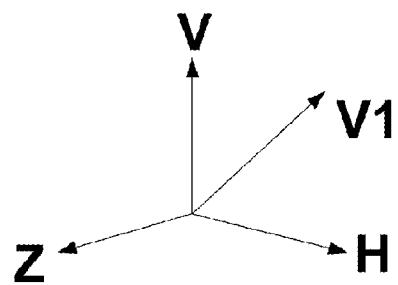

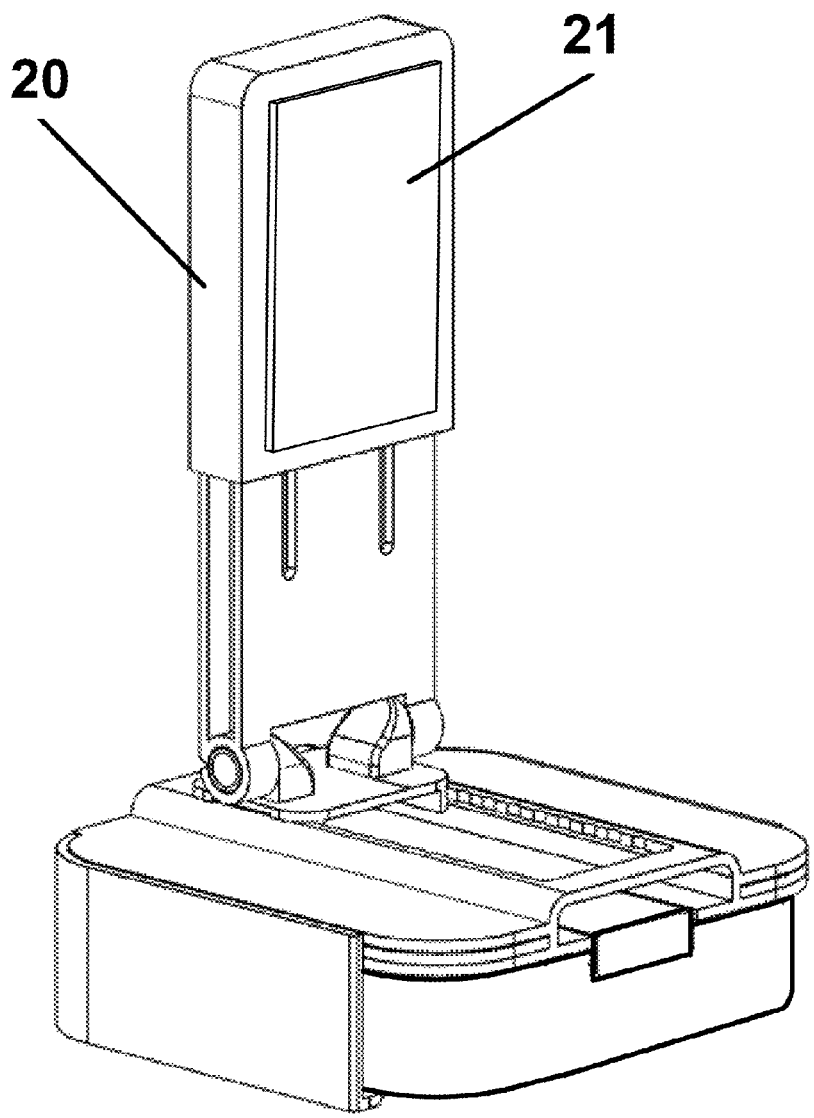
FIG. 4E
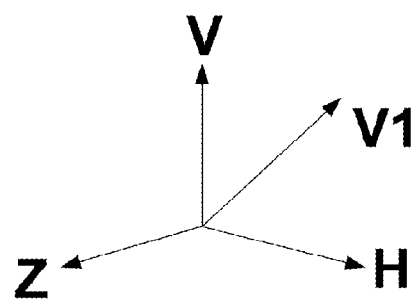

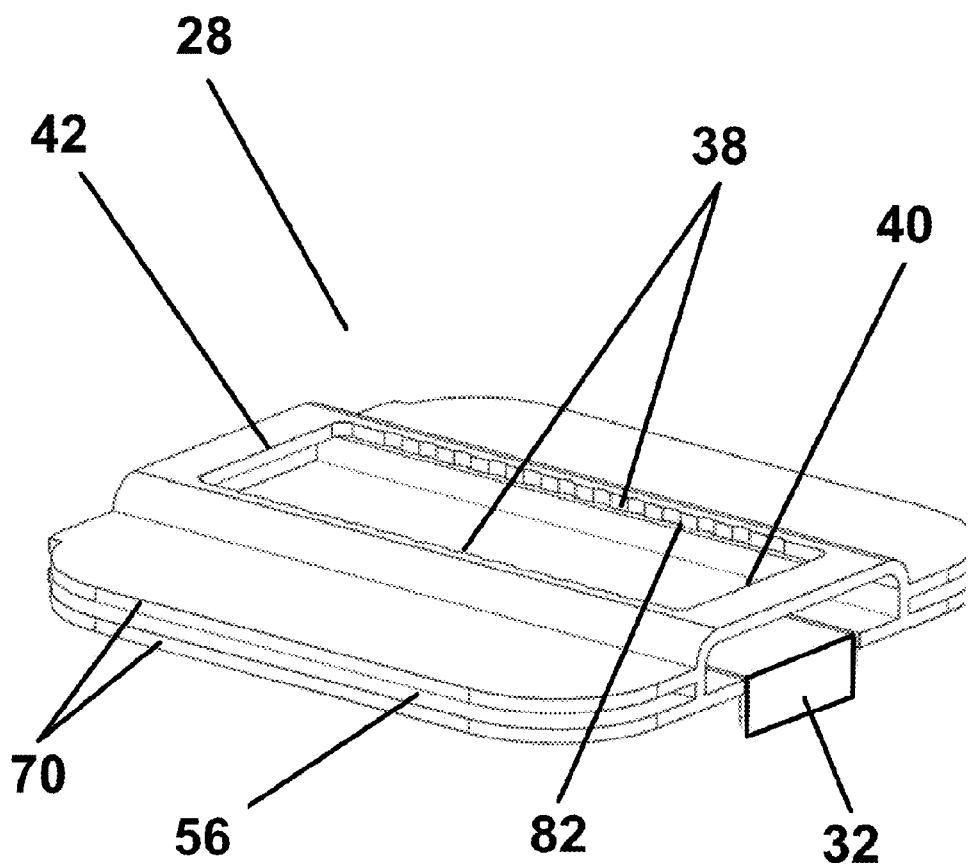
FIG. 5A
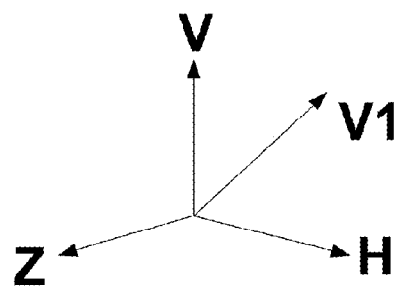

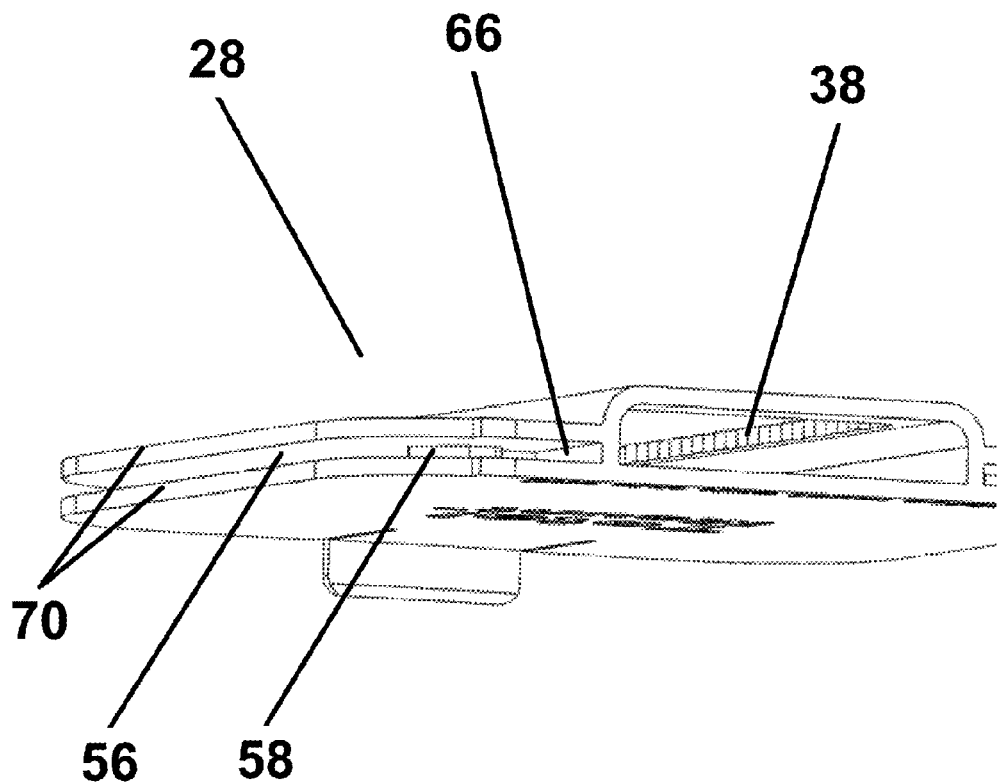
FIG. 5B
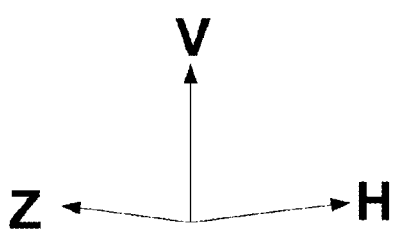

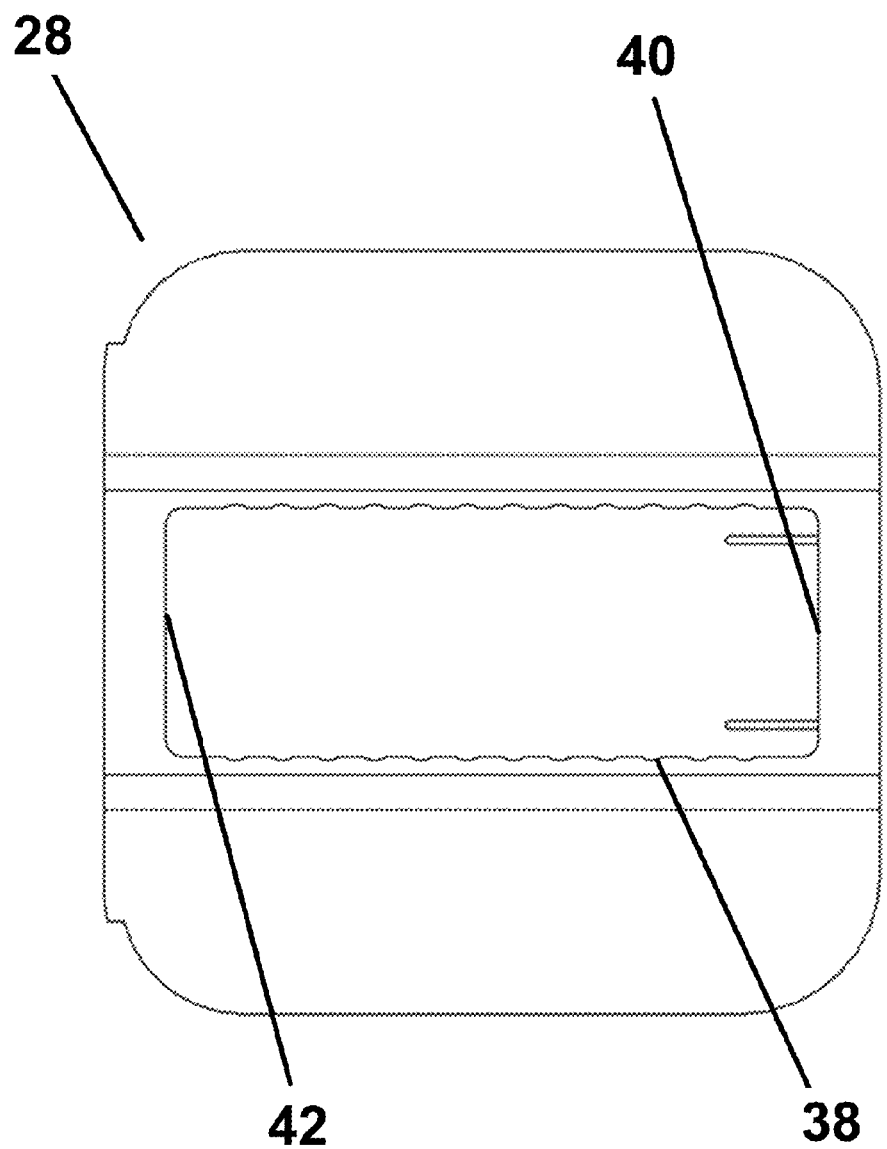
FIG. 5C
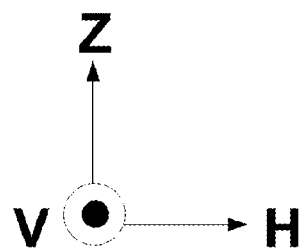

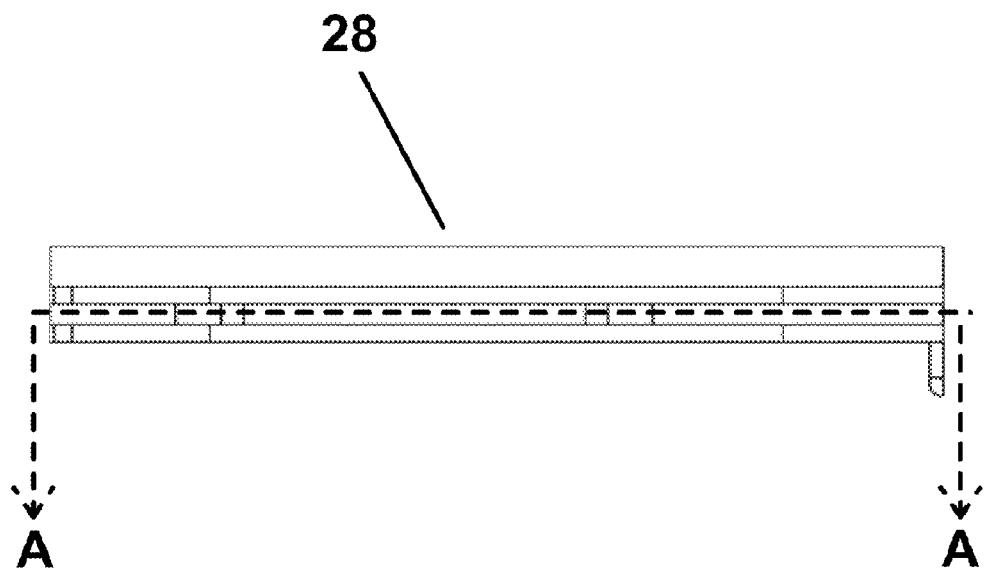
FIG. 5D
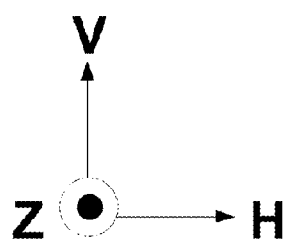

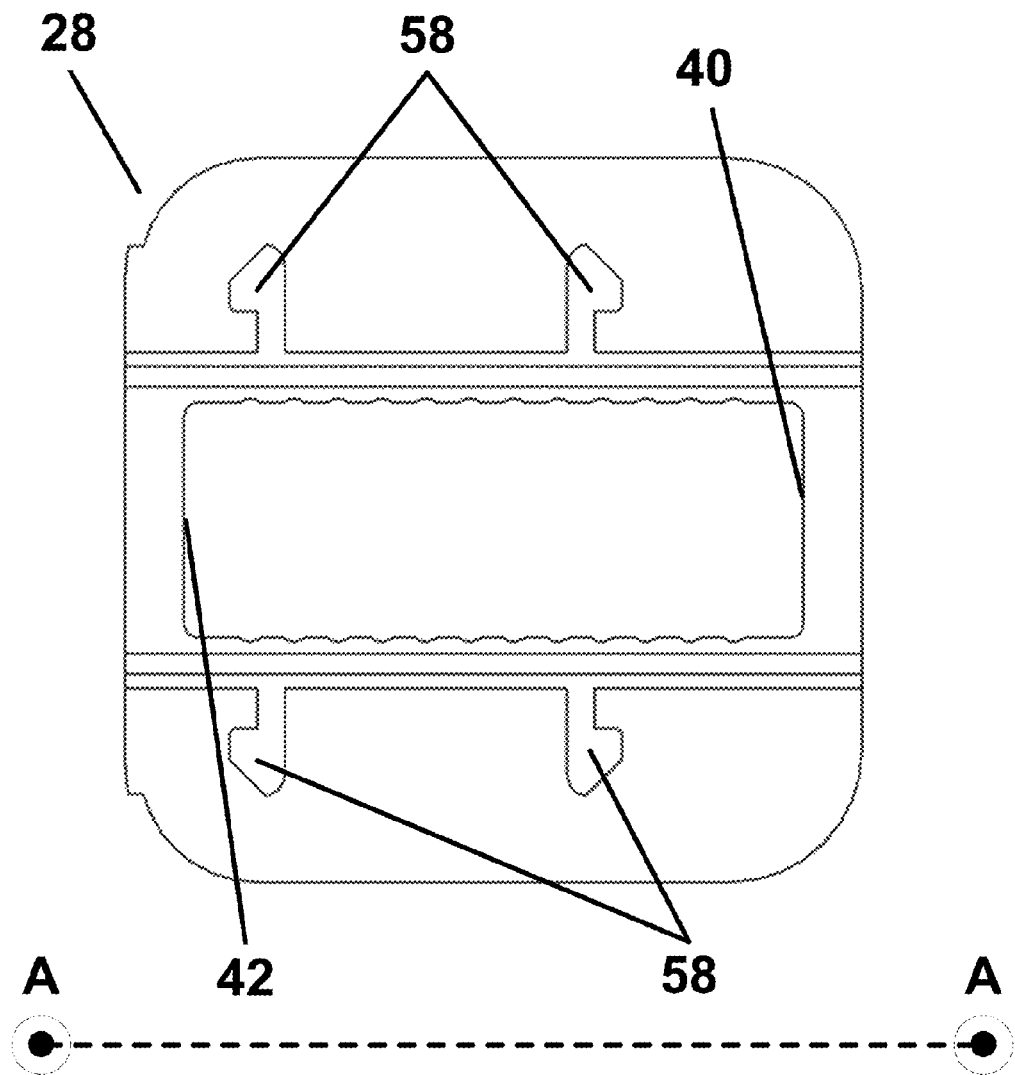
FIG. 5E
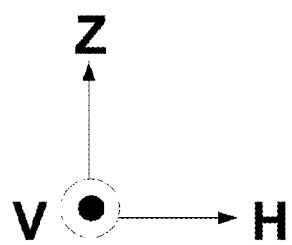

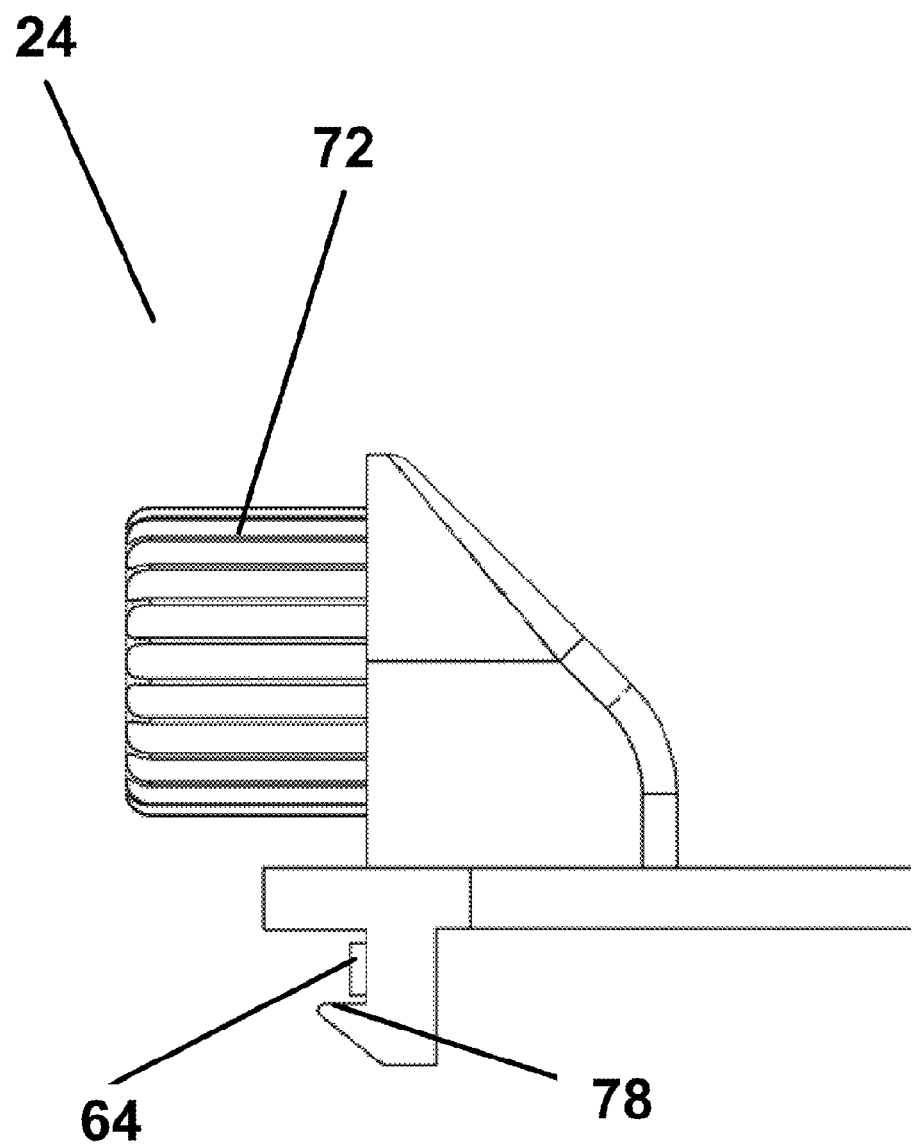
FIG. 6C
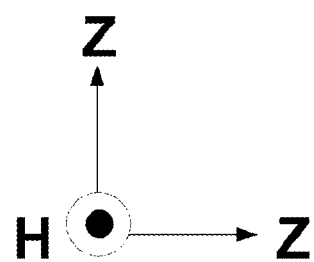

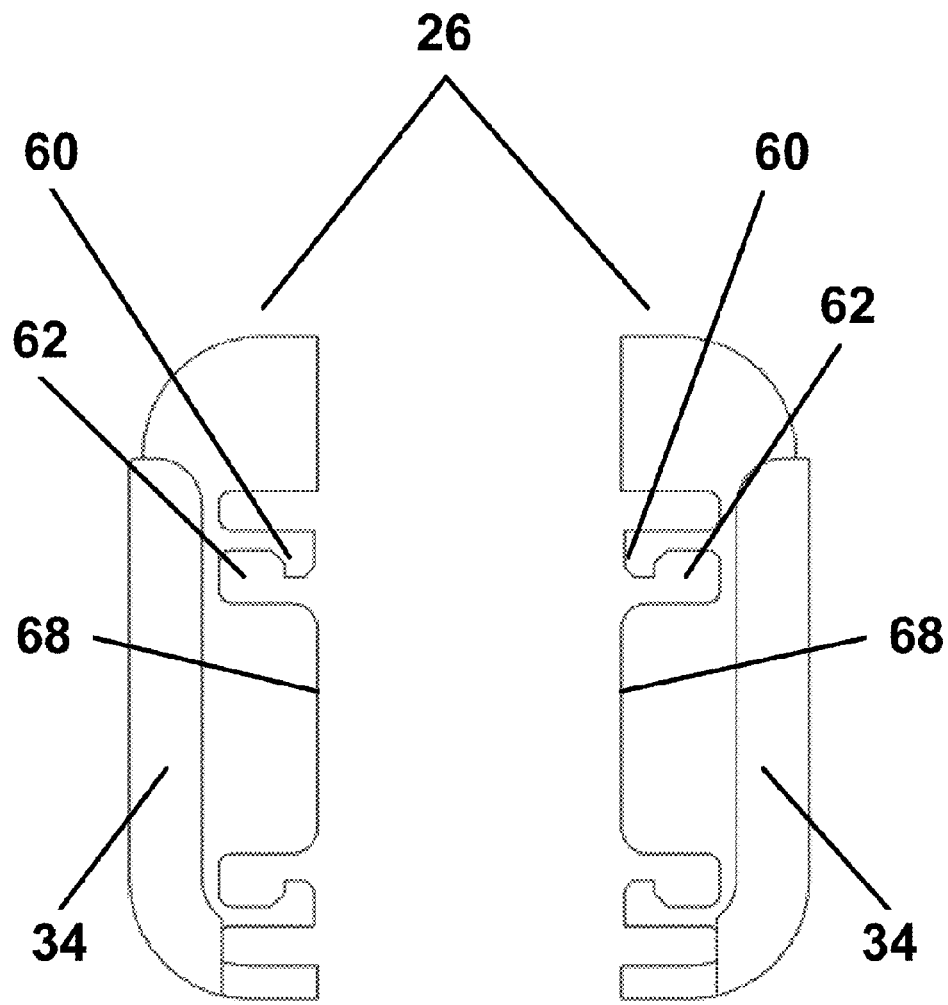
FIG. 7A
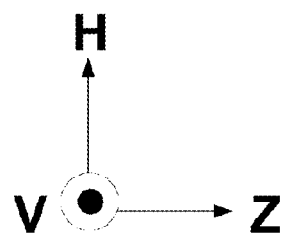

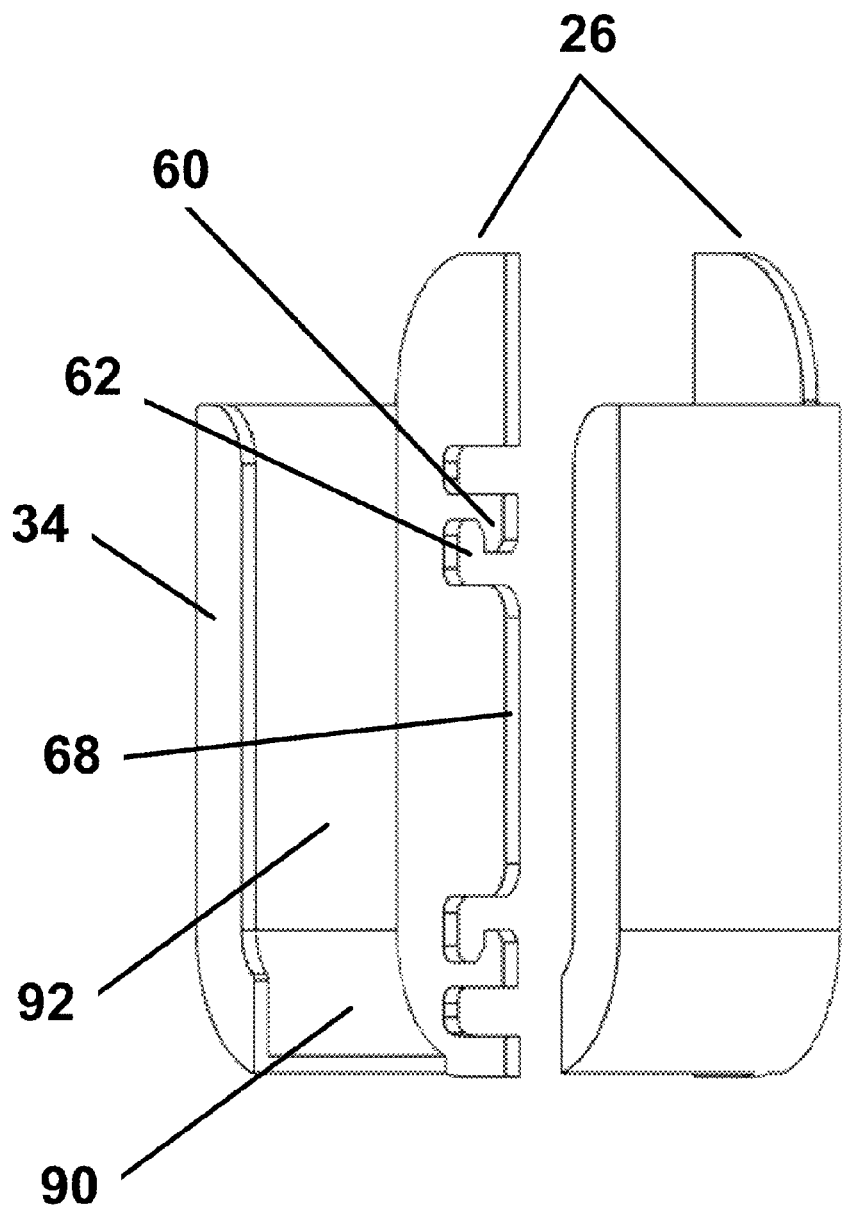
FIG. 7B
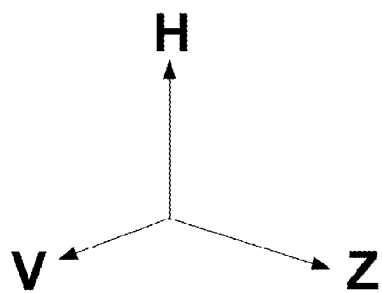

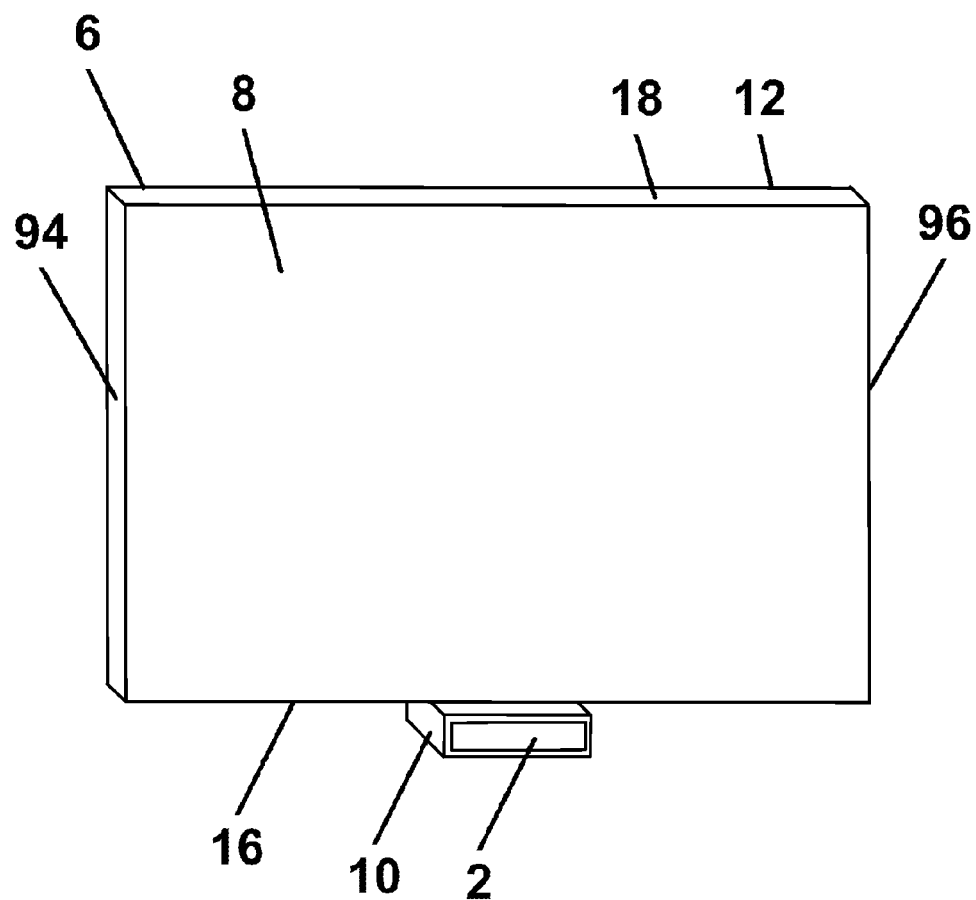
FIG. 8A
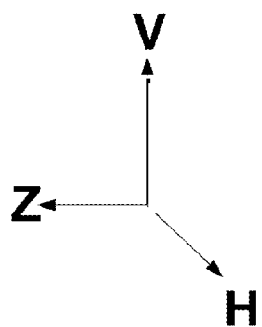

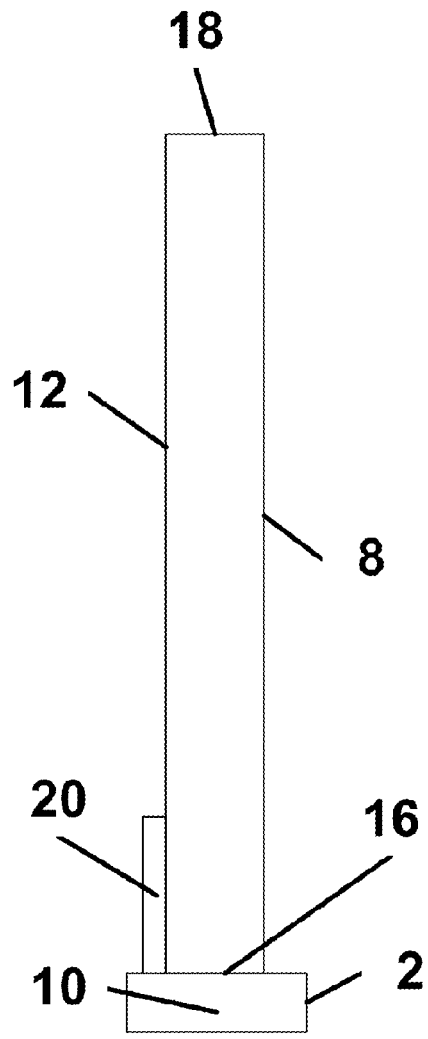
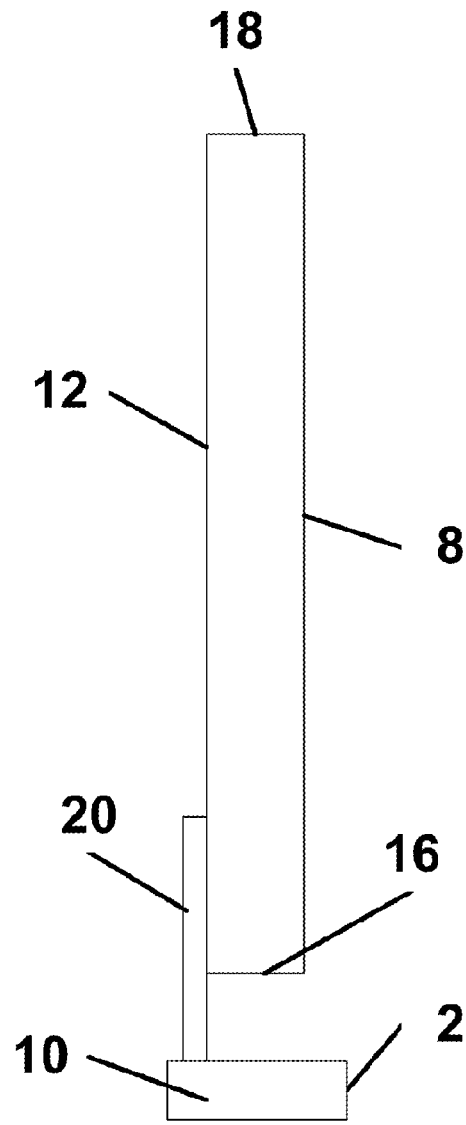
FIG. 9A
FIG. 9B
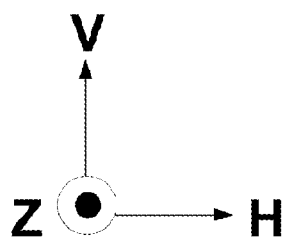

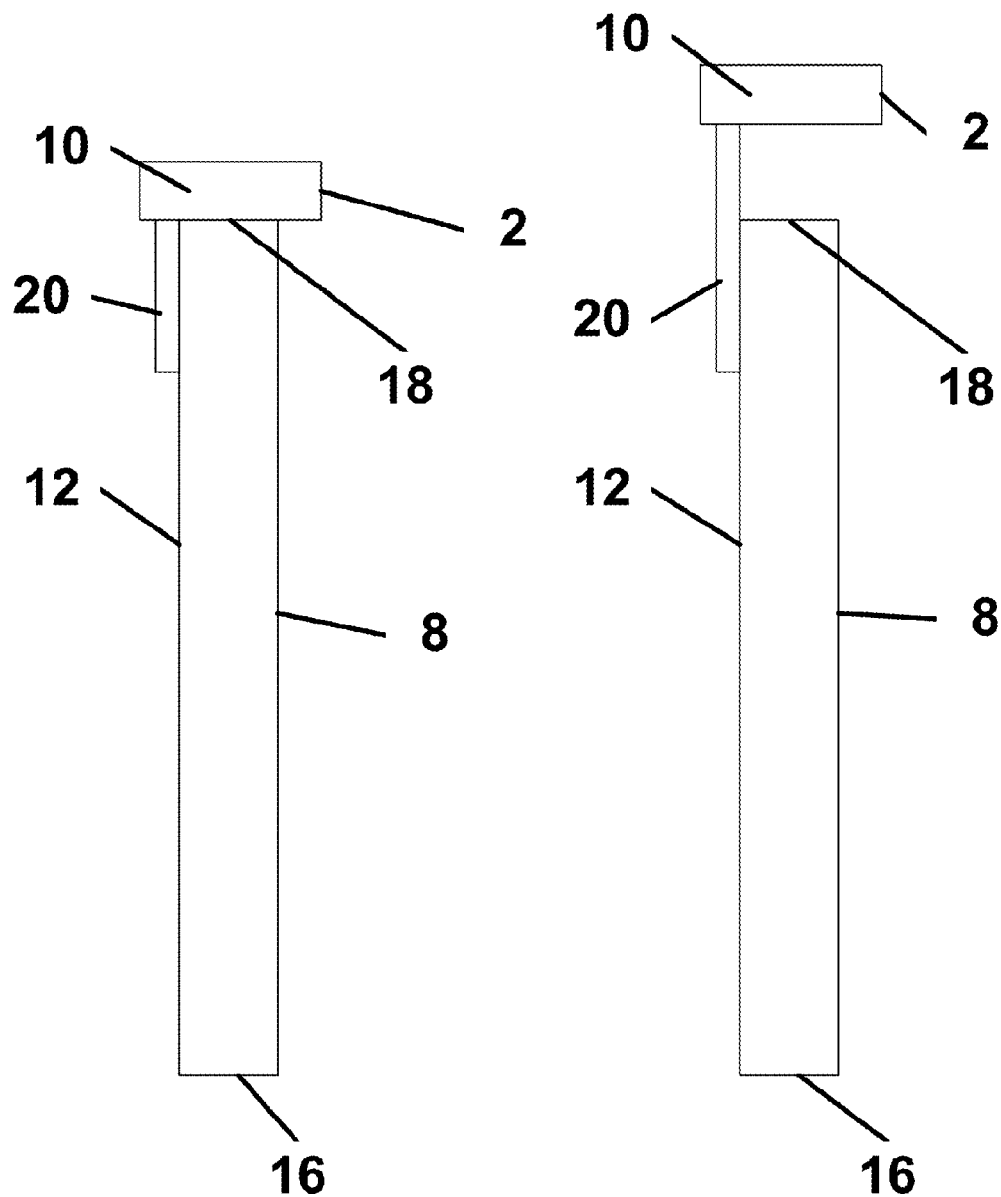
FIG. 9C     FIG. 9D
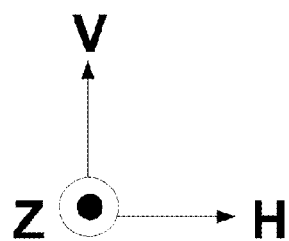

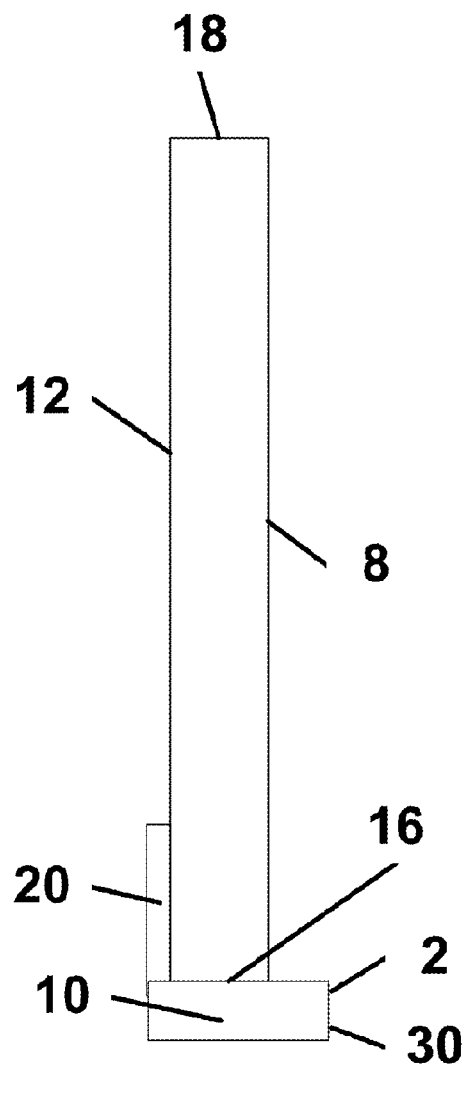 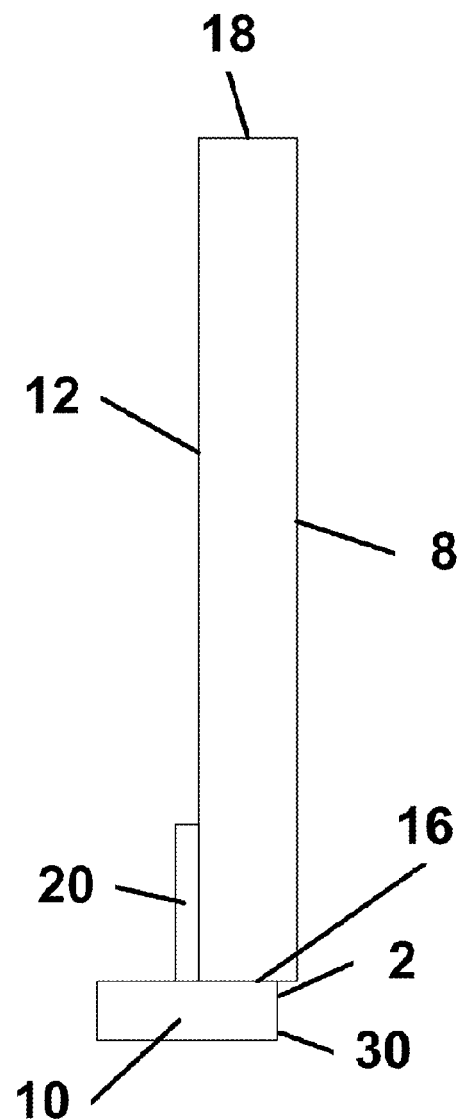
FIG. 9E  FIG. 9F
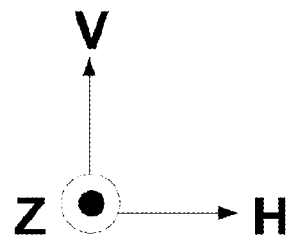

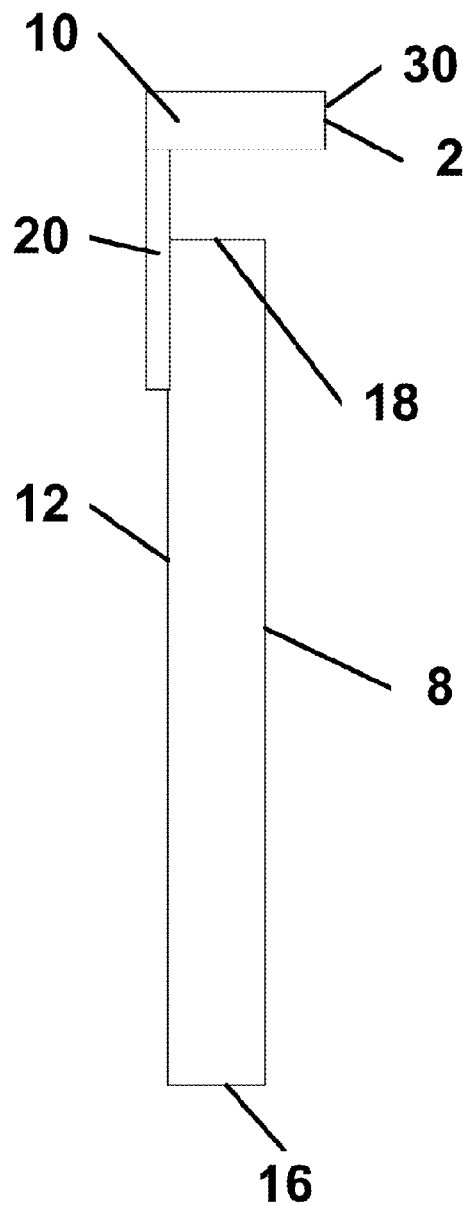 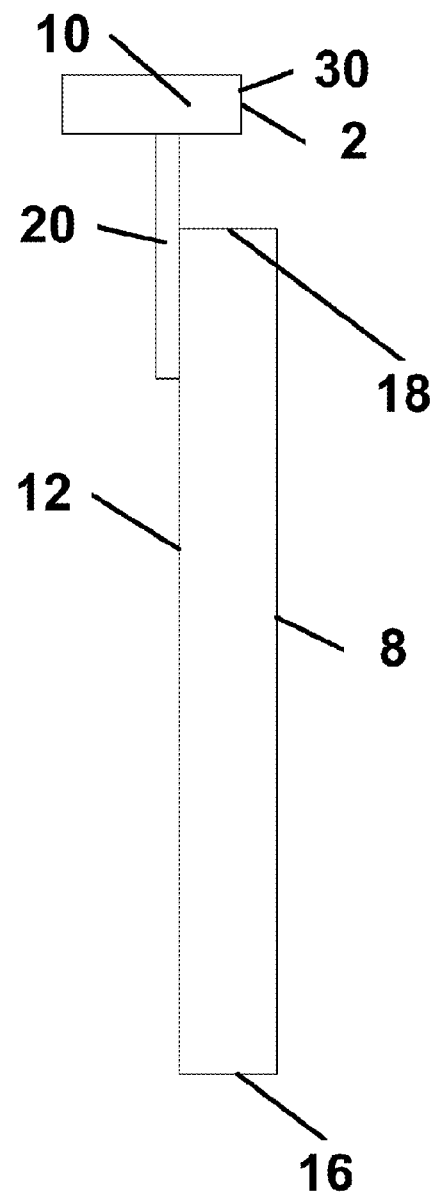
FIG. 9G  FIG. 9H
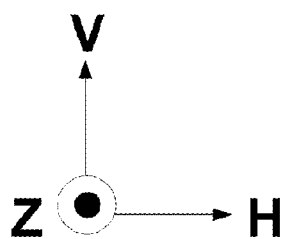

MOUNTING SYSTEMS FOR DIGITAL MEDIA PLAYERS

CROSS REFERENCE TO RELATED APPLICATIONS

U.S. patent application Ser. No. 13/278,759, filed on Oct. 21, 2011; U.S. patent application Ser. No. 13/332,373, filed on Dec. 21, 2011; U.S. patent application Ser. No. 13/779,733, filed on Feb. 27, 2013; and U.S. patent application Ser. No. 13/781,717, filed on Feb. 28, 2013 are hereby incorporated by reference.

BACKGROUND

Users often place digital media players near a television. Television owners desire a convenient means to couple digital media players.

SUMMARY

In one embodiment, a mounting device for coupling a digital media player to a screen includes an arm that is configured to couple to the screen. The screen includes a screenside, a backside, a topside, and a bottomside. The screenside is configured to project images and is located at an opposite end of the screen as the backside. The topside and bottomside are located at opposite vertical ends of the screen. The mounting device also includes a tray that is configured to couple to the arm and configured to support the digital media player along the bottomside of the screen.

In another embodiment, a mounting device is configured to couple a digital media player to a screen. The screen includes a screenside configured to project images. The screenside is located at an opposite end of the screen as a backside. The screen also includes a topside and a bottomside located at opposite vertical ends of the screen. The mounting device includes an arm configured to be coupled to the backside, bottomside, or topside of the screen via adhesive. The mounting device also includes a tray that is configured to couple to the arm and configured to support the digital media player.

In yet another embodiment, a mounting device for coupling a digital media player to a screen includes a base portion and at least two outside walls that are configured to support the digital media player. The mounting device also includes an arm that is coupled to the base portion. The arm is configured to rotate and extend with respect to the base portion and is configured to couple to the screen.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A-4E illustrate various embodiments of mounting device coupled with digital media player.
FIGS. 5A-5E illustrate various views of a top member.
FIGS. 6A-6D illustrate various views of a top slide member.
FIGS. 7A-7B illustrate different views of a side member.
FIGS. 8A-8B illustrate two different configurations for coupling mounting device and digital media player to screen.
FIGS. 9A-9J illustrate various horizontal, vertical, and pivotal positions of mounting device with respect to the screen.

DETAILED DESCRIPTION

The drawings show specific embodiments in which the invention may be practiced, by way of example or illustration and not by way of limitation. These embodiments are described in enough detail through text and drawing figures to enable those skilled in the art to practice the claimed invention. The embodiments may be combined, other embodiments or embodiments may be utilized, or structural, logical and mechanical changes may be made without departing from the scope and spirit of the claimed invention. The following description is, therefore, not to be taken in a limiting sense. The description below illustrates implementations of the invention and does not limit the invention.

Owners of digital media players often prefer to couple their digital media player near their screens. For example, a person who owns a flat screen television that is coupled to the wall might want to couple the digital media player onto the flat screen television or onto the wall behind the flat screen television.

Figure 1:
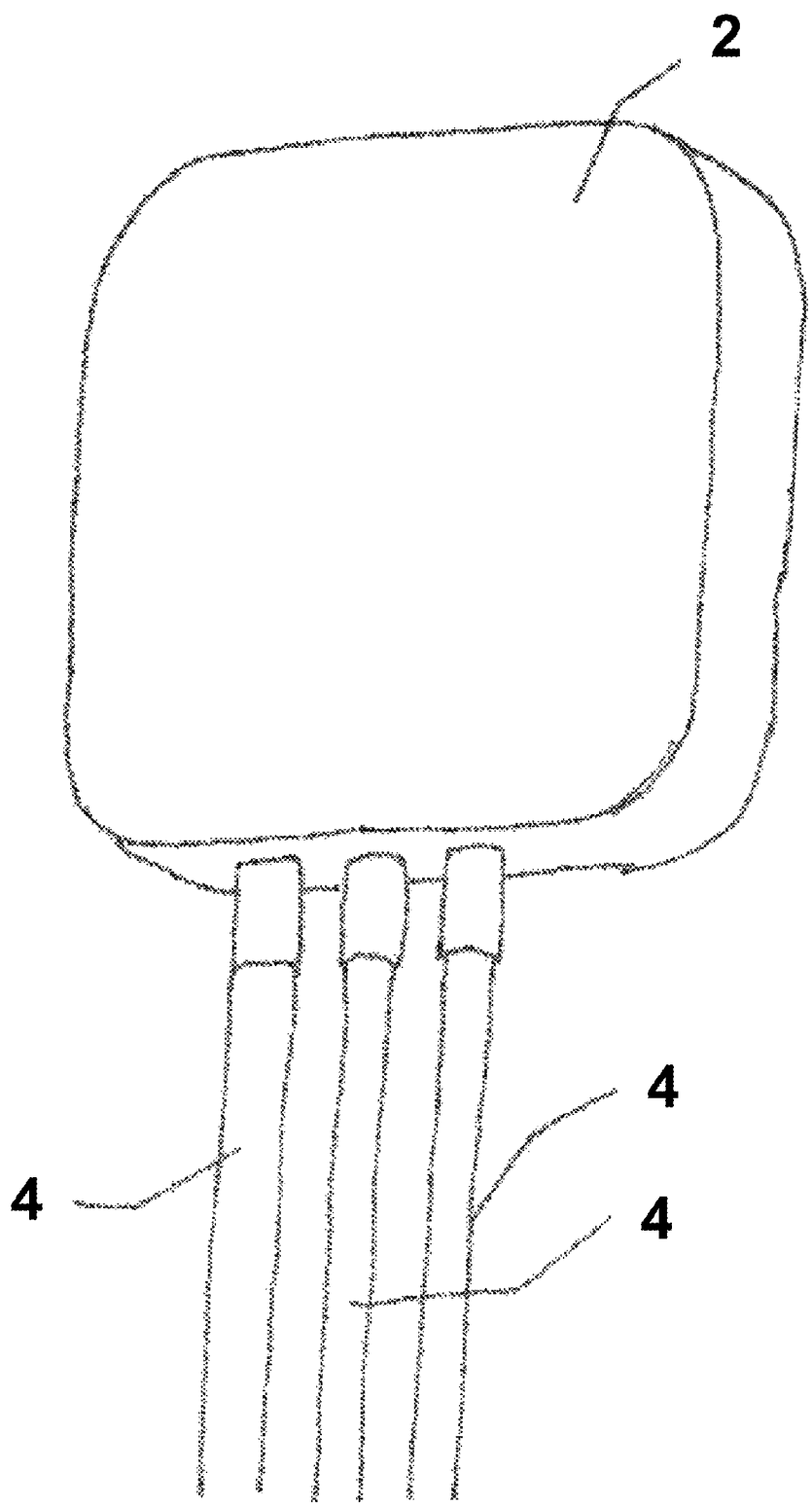
FIG. 1 illustrates a digital media player.

FIG. 1 illustrates digital media player 2 including cables 4. Digital media players include Digital Video Disc (DVD) players, Blu-ray players, and digital media extenders such as an Apple TV, Roku, Boxee TV, Netgear NeoTV, D-Link Boxee Box, Logitech Revue, WD-TV Live, any Sony SMP-series devices, Seagate GoFlex TV, LG SmartTV Upgrader, Sony Bravia Internet Video Link, or any other digital media extender. Digital media players also include video game consoles such as Ouya, Wii U, Wii, GameStick, Shield Project, Steam Box, Atari Flashback 2, Atari Flashback 3, Atari Flashback 4, EVO Smart Console, Retro Duo, Game Wave, Mattel HyperScan, OnLive, PlayStation 3, PlayStation 3 Slim, PlayStation 3 Super Slim, Xbox 360, Xbox 360 Slim, Zeebo, Zone, Sega Zone, or any other video game console.

Cables 4 are electrically connected to digital media player 2. In one embodiment, digital signals are transmitted through cables 4. The digital signals may be sent or received by digital media player 2. Cables 4 may include a cable such as a High-Definition Multimedia Interface (HDMI) cable. In the same or in a different embodiment, digital media player 2 also receives power through cables 4. As such, cables 4 may also include any cable that is capable of power transmission.

In some embodiments, cables 4 include only one cable. In this embodiment the one cable is capable of transmitting digital signals and/or power. In this manner, the digital signals or power may be transmitted wirelessly, while the other is transmitted through the one cable. In some embodiments, neither the digital signals nor power is transmitted wirelessly. In this manner, the one cable transmits both the digital signals and power. In some embodiments, cables 4 comprise two or more cables that are capable of transmitting digital signals, power, and any other electrical signal. In other embodiments, digital media player 2 is devoid of cables 4. In this manner, digital media player 2 receives and/or sends digital signals and/or power wirelessly.

Figure 2A:
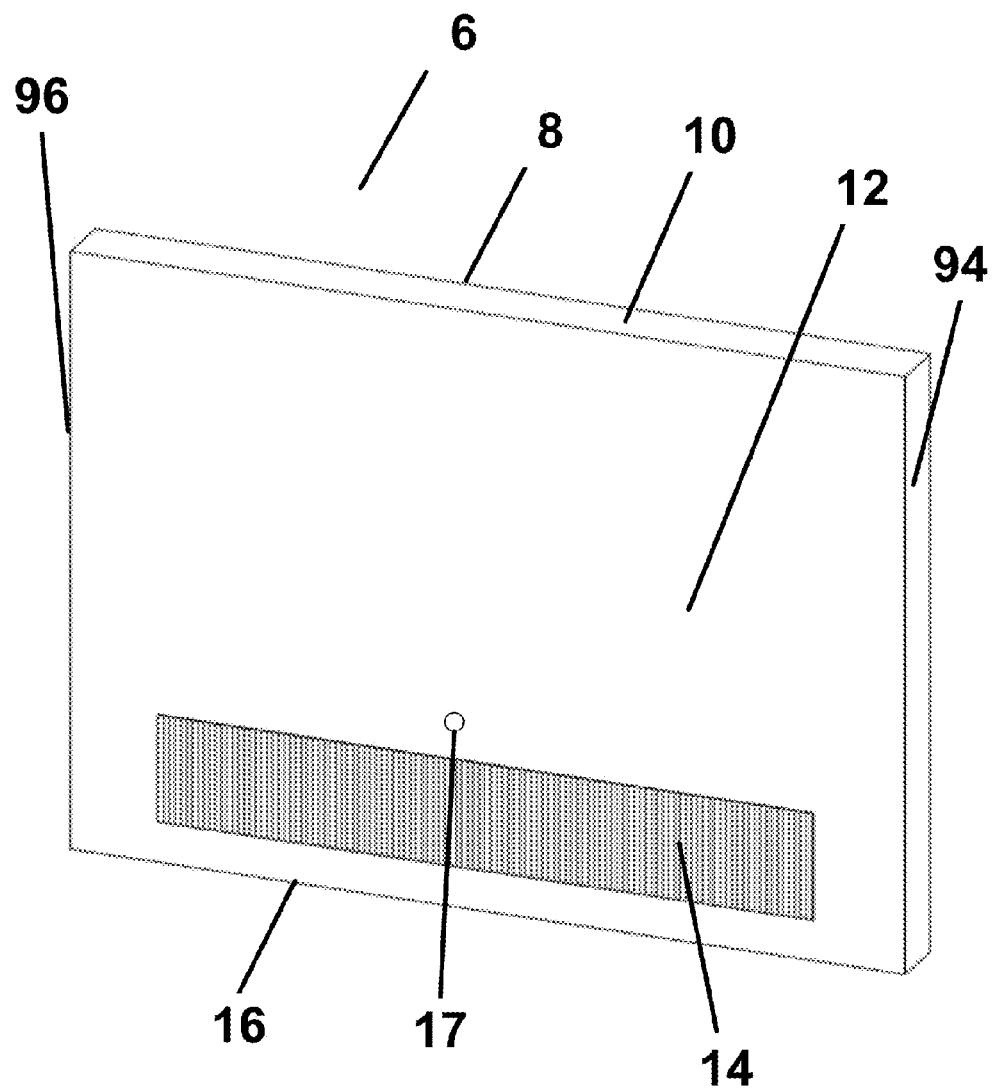
FIG. 2A illustrates a backside of a screen.
Figure 2A:
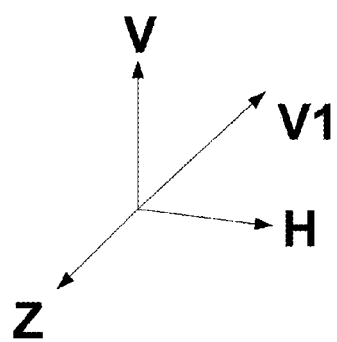
Figure 2B:
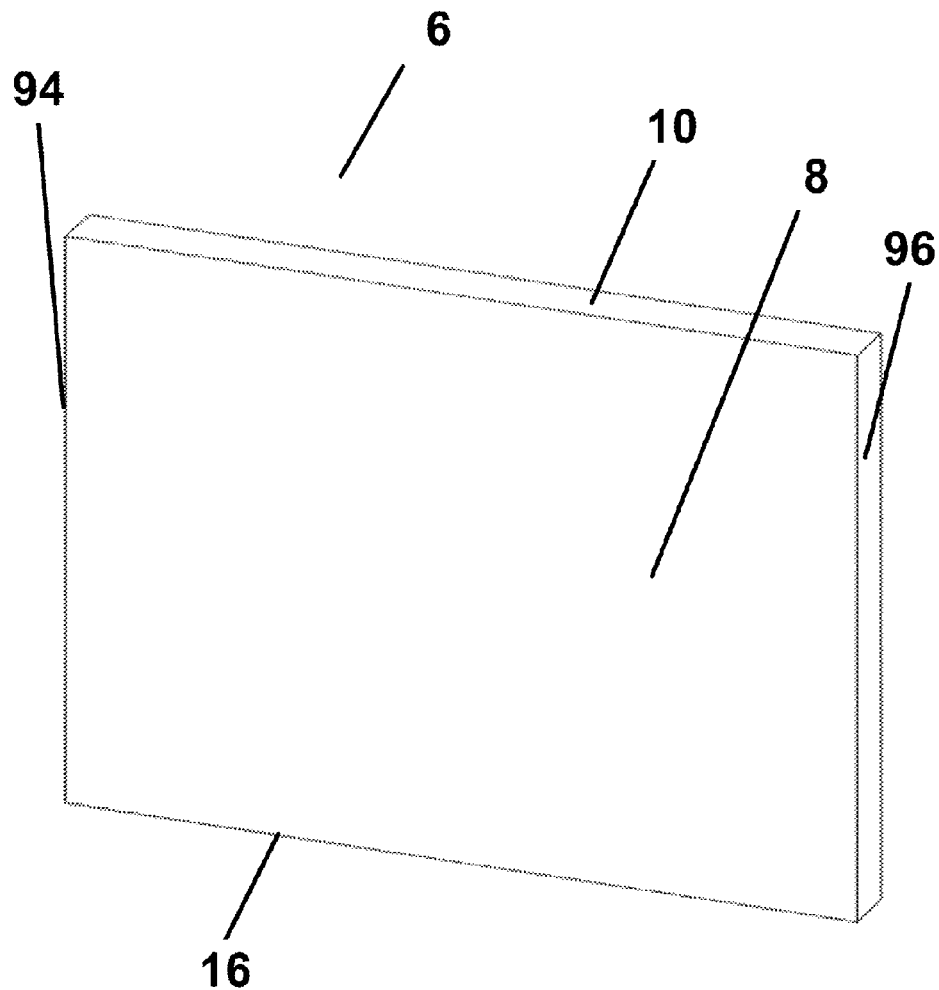
FIG. 2B illustrates a frontside of the screen.
Figure 2B:
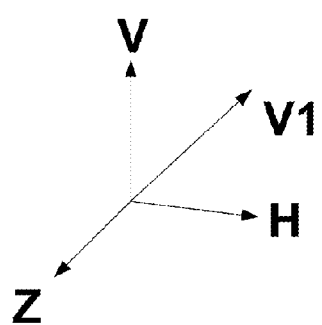

FIGS. 2A-2B illustrate screen 6, which includes screenside 8, topside 18, backside 12, vent 14, bottomside 16, threaded hole 17, first side 94, and second side 96. Screen 6 includes any computer monitor, television, image-producing portion of movie projectors, video game console, or any device capable of projecting images. Televisions include flat-panel displays, flat-screen televisions, and tube televisions. While it is not illustrated in FIGS. 2A-2B, digital media player 2 is electrically connected to screen 6. The electrical connection between digital media player 2 and screen 6 may be achieved via a wired or wireless connection. The wired connection may include the HDMI cables as described above, or any other cable that is configured to transmit digital signals. In this embodiment, digital media player 2 transmits digital signals to screen 6, which are then displayed as visual images on screen 6, via screenside 8. While not illustrated, screen 6 may also include a power cord that is electrically connected to screen 6 at one end and electrically connected to a power source at the other end.

Screen 6 includes screenside 8, which is configured to display images. Screen 6 also includes backside 12, which is located at an opposite side as screenside 8 along a depth direction Z. Backside 12 may include vents 14. Screen manufacturers often include vents 14 on backside 12 to allow heat to escape from inside screen 6. Screen 6 further includes topside 18 and bottomside 16, which are located at opposite vertical ends on screen 6 along the vertical direction V. In one embodiment, topside 18 or bottomside 16 may support digital media player 2.

The embodiment illustrated in FIG. 2A shows backside 12 further including a threaded hole 17. Threaded hole 17 may be configured to receive a threaded screw, which is not shown in this embodiment. In this manner, screen 6 may be coupled to a device such as a mounting device 10 by threading a screw through mounting device 10 and in to threaded hole 17. It should also be appreciated that in some embodiments, screen 6 may include two or more threaded holes 17. In this manner, one or more screws may be threaded in to any one or more of the two or more threaded holes 17 to couple mounting device 10 to screen 6.

To orient the different sides of screen 6 and the various mounting locations, FIGS. 2A-2B also illustrate vertical direction V, horizontal direction H, and depth direction Z.

Figure 3:
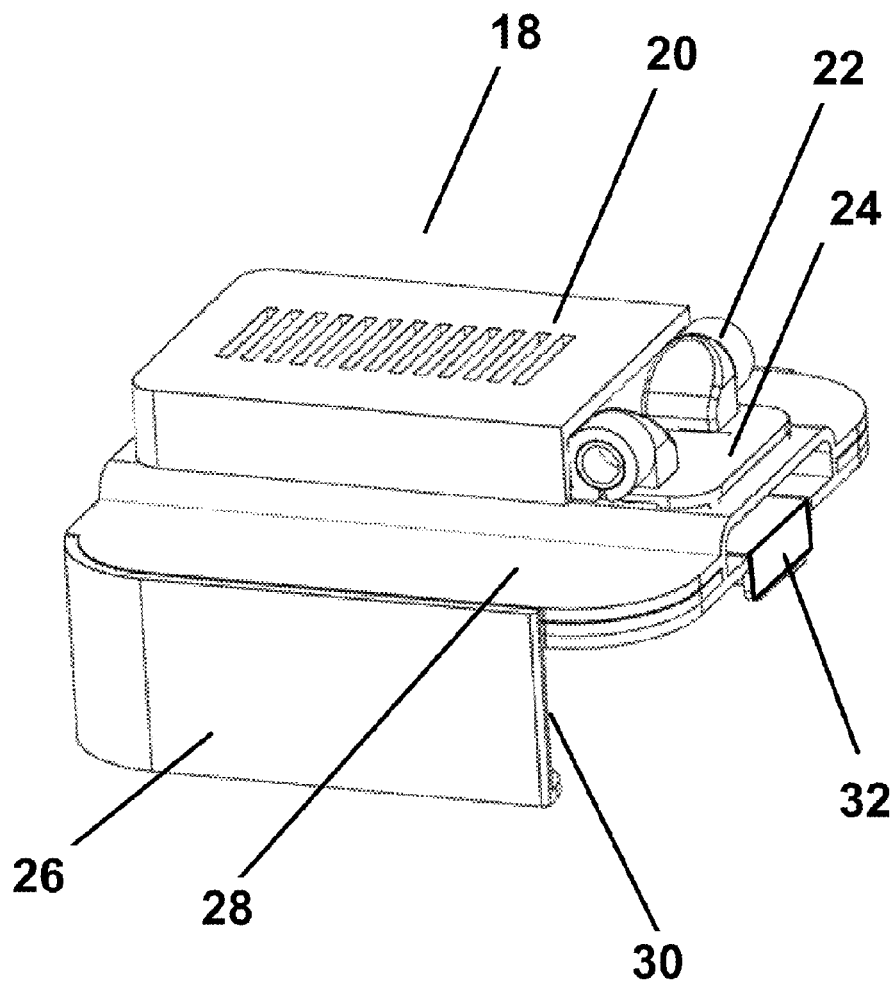
FIG. 3 illustrates a mounting device.

FIG. 3 illustrates mounting device 10. In the embodiment shown in FIG. 3, mounting device 10 includes extension member 20, pivot member 22, top slide member 24, side members 26, top member 28, front opening 30, and frontside retention member 32. Extension member 20 is slidably coupled to pivot member 22. Pivot member 22 is pivotally coupled to top slide member 24.

In the embodiment shown in FIG. 3, mounting device 10 also includes side members 26, top member 28, and front retention member 32. Top member 28 is slidably coupled to top slide member 24 and snapably coupled to side members 26. In this manner, a user may easily remove side members 26 from top member 28 without using any tools. In the embodiment shown in FIG. 3, side members 26 may support digital media player 2. Accordingly, mounting device 10 may be sized to accommodate any of the digital media players previously mentioned.

In the embodiment shown in FIG. 3, front retention member 32 may serve to retain any digital media player that is coupled to mounting device 10. As such, front retention member 32 may serve to prevent digital media player 2 from falling to the ground and suffering damage. In other embodiments, mounting device 10 does not include front retention member 32. In other embodiments, mounting device 10 includes any type of retention member, such as adhesive, hook and loop fasteners, or any type of mechanical interference. Mechanical interference may include any type of interference that prevents digital media player 2 from falling out of mounting device 10, such as a press fit or any interference that serves to achieve this purpose.

In the embodiment shown in FIG. 3, mounting device 10 also includes frontside opening 30. Frontside opening 30 serves to provide line of sight between digital media player 2 and the user and/or any remote control devices that are coupled with digital media player 2.

Figure 4A:
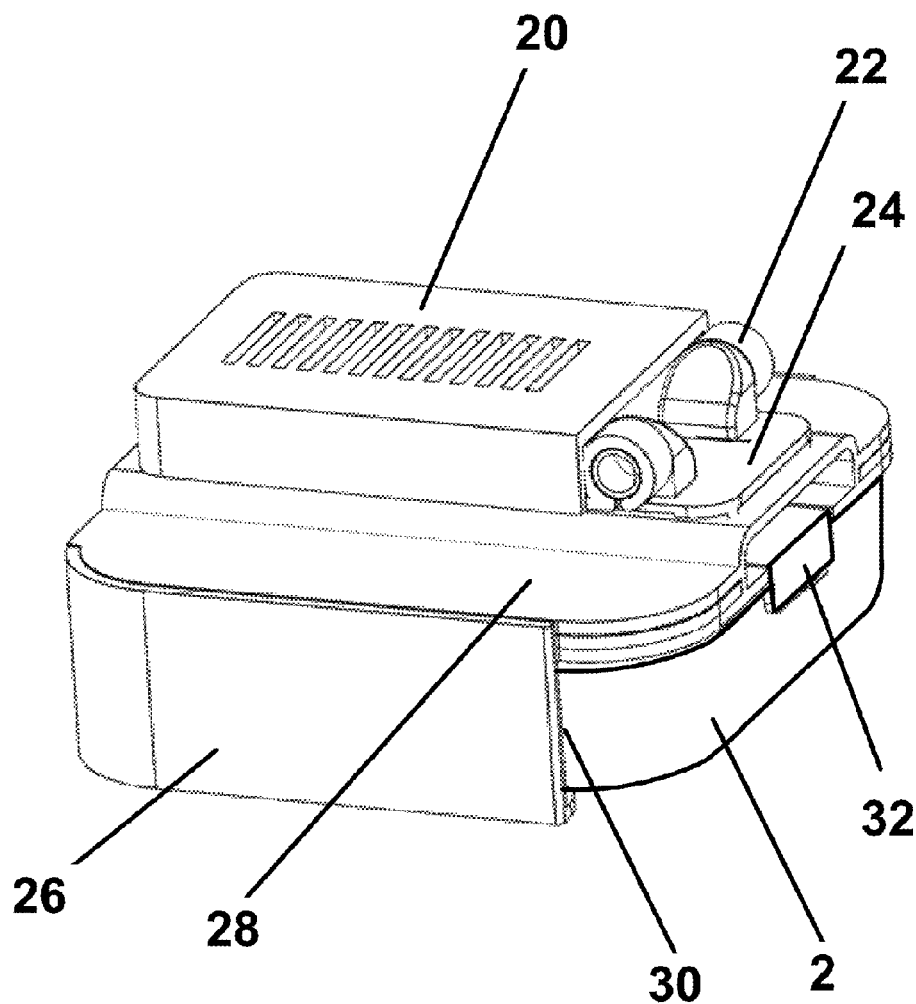

FIG. 4A illustrates the embodiment shown in FIG. 3 further including digital media player 2. In FIG. 4A, digital media player 2 is slidably coupled to mounting device 10. In this manner, mounting device 10 securely retains digital media player 2 within mounting device 10. Mounting device 10 may be configured to accommodate any digital media player mentioned in this disclosure.

The embodiment illustrated in FIG. 4A also shows front edge 44 of top slide member 24 as abutting front wall 40 of slide channel 38. The embodiment shown in FIG. 4A also illustrates extension member 20 and pivot member 22, effectively at a 0° angle with respect to top member 28. In this manner, extension member 20 is substantially parallel to top member 28.

FIG. 4A illustrates a frontside retention member 32 that is configured to hold a digital media player 2 inside the mounting device 10. In some embodiments, the frontside retention member 32 protrudes away from the top member 28 such that the frontside retention member 32 covers a portion of the digital media player 2. The frontside retention member 32 can be a cantilever beam configured to flex or deform. The portion that protrudes away from the top member 28 can be oriented within plus or minus 20 degrees of perpendicular to the cantilever beam.

FIG. 4A also illustrates side members 26 that define at least a portion of the mounting device 10 that is narrower than the digital media player 2. As a result, inserting the digital media player 2 into the mounting device 10 may deform the side members 26 by pushing the side members 26 farther apart. The friction caused by deforming the mounting device 10 may at least partially secure the digital media player 2 inside the mounting device 10.

Figure 4B:
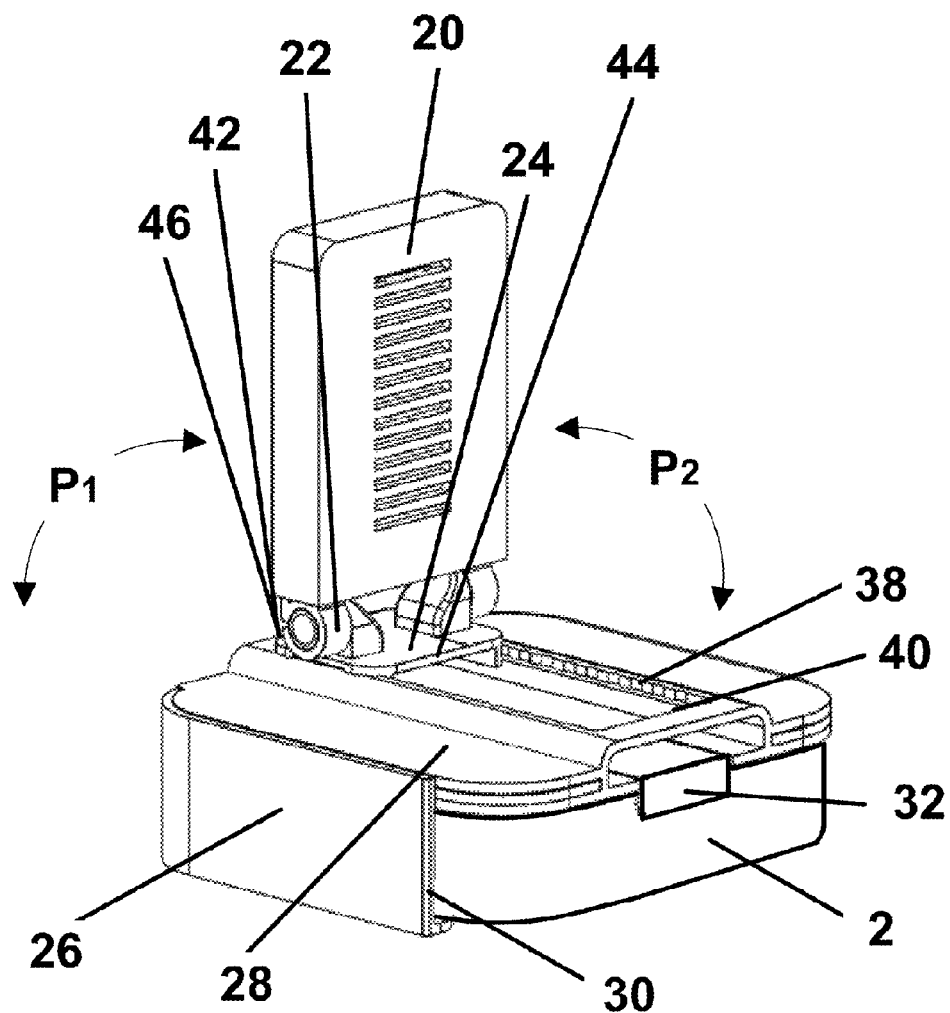
Figure 4B:
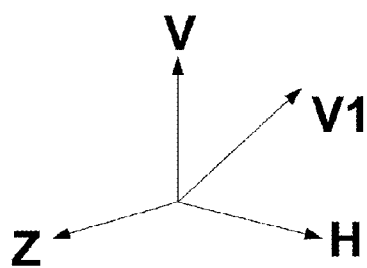

FIG. 4A illustrates the mounting device 10 in a collapsed configuration. FIG. 4C illustrates the mounting device 10 with the arm moved towards a middle portion of the top member 28 (or base portion) to uncollapse the mounting device 10. FIGS. 4B and 4C illustrate that extending the arm, such as extension member 20, can increase an overall length of the arm. It should be appreciated that some embodiments include arms that do not extend.

Protruding away from the base portion in a vertical direction does not necessarily mean the arm is perpendicular to the base portion. Any direction that is out of the plane defined by the base portion can be a vertical direction, as defined by the fourth direction V1. In some embodiments, the fourth direction V1 is within plus or minus 40 degrees of being perpendicular to the base portion.

FIG. 4B illustrates mounting device 10 in a different configuration than the illustration shown in FIG. 4A. In the illustration shown in FIG. 4B, extension member 20 and pivot member 22 is pivoted 90° along pivot positions P1 and P2 from the configuration shown in FIG. 4A, such that the extension member is substantially parallel to vertical direction V. In the embodiment shown in FIG. 4B, extension member 20 and pivot member 22 are configured to pivot to any position along pivot positions P1 and P2, which thereby effectively allows extension member 20 and pivot member 22 to pivot at least 180° from the original configuration shown in FIG. 4A to any point along pivot positions P1 and P2.

Furthermore, the ability of extension member 20 and pivot member 22 to pivot allows the user to couple extension member 20 to a mating interface. The mating interface may include any of the following, including, but not limited to: topside 18 of screen 6, backside 12 of screen 6, vents 14 of screen 6, bottomside 16 of screen 6, screenside 8 of screen 6, a wall, or any other stationary device located adjacent to screen 6. Because extension member 20 and pivot member 22 are able to pivot up to and beyond 180° they are able to adapt to a mating interface positioned at any angle with respect to the ground.

In one embodiment, backside 12 of screen 6 is not perpendicular with respect to the ground, and is at an angle not equal to 90°. In this scenario, extension member 20 and pivot member 22 are able to pivot to any desired angle thereby allowing the user to angle digital media player 2 to be parallel to the ground, or at any angle that the user desires. For example, if extension member 20 is coupled to a structure that is located high off the ground, the user may aim digital media player 2 down toward the ground, so as to maintain line of sight between digital media player 2 and the user and/or remote control device that is coupled with digital media player 2.

FIG. 4B also illustrates top slide member 24 positioned in a different configuration than the illustration shown in FIG. 4A. In the illustrations shown in FIGS. 4A-4B, top slide member 24 is relocated from a first position, wherein the top slide member 24 is abutting front wall member 40 in the first position (as illustrated in FIG. 4A), to a second position, wherein the top slide member 24 is abutting back wall 42 in the second position (as illustrated in FIG. 4B). In this manner, top slide member 24 may slide along and be positioned at any point along slide channel 38.

FIG. 4C illustrates yet another configuration of mounting device 10. In the embodiment illustrated in FIG. 4C, extension member 20 slides along pivot member 22. In this manner, extension member 20 is effectively elongated with respect to top member 28. This elongation is accomplished by the slidable connection between extension member 20 and pivot member 22. Extension member 20 is configured to slide along pivot member 22 such that extension member edge 54 is configured to be located at any position along extension position EL. As extension member 20 slides along pivot member 22, extension member 20 may be configured to stop and lock in place at a discrete location on pivot member 22. In the embodiment shown in FIG. 4C, extension member 20 may lock in place with respect to pivot member 22. In this manner, snap member 50 of pivot member 22 may engage slot member 52 of extension member 20. To lock extension member 20 in place with respect to pivot member 22, the user may move extension member 20 to the desired location and then stop where the user desires to lock extension member 20. In this manner, extension member 20 may be locked in place with respect to pivot member 22.

In order to lock extension member 20 in place with respect to pivot member 22, snap member 50 may engage the nearest slot member 52, thereby locking extension member 20 in place with respect to pivot member 22. Furthermore, snap member 50 may be configured to have sufficient elasticity so that after snap member 50 has engaged slot member 52, the user is able to easily disengage snap member 50 from slot member 52, thereby allowing the user to easily move extension member 20 to a different position along pivot member 22. In another embodiment the user may perform an additional operation in order to reposition extension member 20. In this manner, the user may push snap member 50 so that it disengages the corresponding slot member 52 before extension member 20 is able to move to a new location.

In the embodiment shown in FIG. 4C, extension member 20 has 13 slot members. In other embodiments, extension member 20 has any number of slot members less than 13 slot members. In other embodiments, extension member 20 has 14 or more slot members. In yet other embodiments, the locking is achieved by alternate locking means other than snap member 50 engaging slot member 52. This alternate locking means may include any other type of mechanical interference (e.g. friction fit), adhesive lock, hook and loop fastener lock, or any other type of locking means.

Figure 4D:
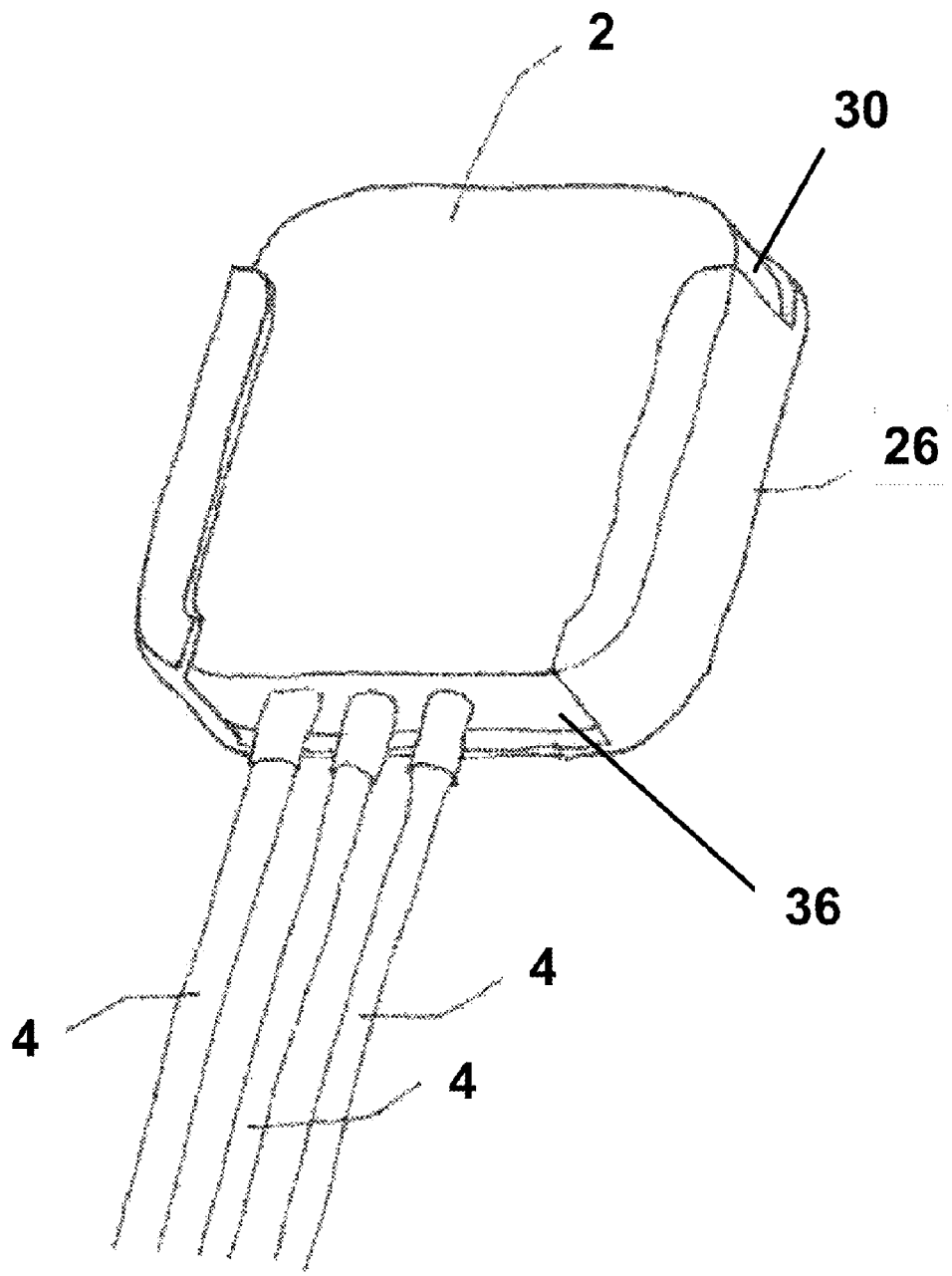

FIG. 4D illustrates a backside of mounting device 10 and backside opening 36, which is located opposite to frontside opening 30. In the embodiment shown in FIG. 4D cables 4 are able to pass through backside opening 36 of mounting device 10 in order to be electrically coupled with digital media player 2. In this manner, backside opening 36 allows the user to have accessibility to any cable jack, battery slot, switch, or any other feature contained on an adjacent face of digital media player to backside opening 36. In other embodiments, mounting device 10 may not include backside opening 36.

FIG. 4E illustrates another embodiment of mounting 18 further including adhesive pad 21. Adhesive pad 21 may be adhered to extension member 20. In this manner, adhesive pad 21 may adhere mounting device 10 to any structure, such as screen 6. "Adhere" means to hold fast or stick by gluing, suction, grasping, or fusing or as if by gluing, suction, grasping, or fusing. In some embodiments, adhesive pad 21 includes foam adhesive that can be cut to various shapes such as rectangles and circles. In other embodiments, adhesive pad 21 does not include padding. Adhesive pad 21 can include double-sided tape and/or a bonding agent such as glue or a suction cup. Adhesive pad 21 can cause permanent or temporary adhesion.

It should be appreciated that any number of adhesive pads 21 may be coupled to extension member 20. It should also be appreciated that adhesive pad 21 may be coupled to any other side of mounting device 10. For example, in some embodiments adhesive pad 21 is adhered to top member 28. In other embodiments, adhesive pad 21 is adhered to pivot member 22, top slide member 24, or side member 26. It should also be appreciated that in other embodiments, adhesive pad 21 is adhered to more than one of these locations on mounting device 10. It should also be appreciated that adhesive pad 21 may be used with various embodiments of mounting device 10. In some embodiments, mounting device 10 comprises a tray that supports digital media player 2. In this manner, adhesive pad 21 is adhered to any location on the tray, which may then adhere the tray to any structure, such as screen 6.

FIGS. 5A-5E illustrate various views of top member 28. The top member 28 is one embodiment of a base portion. A base portion couples one outside wall to another outside wall, such as side members 26. In some embodiments, the outside walls are oriented roughly perpendicular to the base portion (as illustrated in FIG. 3). Mounting devices are not always oriented such that top members 28 are oriented near a top portion of the mounting devices. The base portion and the two outside walls can be configured to hold the digital media player.

Orienting digital media player 2 approximately horizontally means orienting the digital media player 2 such that a top surface or bottom surface of the digital media player 2 is within plus or minus forty degrees of horizontal in relation to the screen 6. The top and bottom surfaces are located at opposite surfaces of the digital media player 2 along the vertical direction V. Some embodiments include orienting a digital media player 2 such that a top surface or bottom surface of the digital media player 2 is within plus or minus thirty degrees of horizontal in relation to the screen 6. Some embodiments include orienting a digital media player 2 such that a top surface or bottom surface of the digital media player 2 is within plus or minus fifteen degrees of horizontal in relation to the screen 6. Some embodiments include orienting a digital media player 2 such that a top surface or bottom surface of the digital media player 2 is within plus or minus five degrees of horizontal in relation to the screen 6.

FIG. 5A illustrates top member 28 with no other components coupled in order to further show slide channel 38, front wall 40, back wall 42, channel 56, and wings 70. In the embodiment shown in FIG. 5A, slide channel 38 contains parallel opposing walls that are lined with a plurality of teeth. The plurality of teeth effectively act as a catch to engage latch member 64 on top slide member 24, as will be further described in FIGS. 6B-6D. In this manner, the plurality of teeth in slide channel 38 lock top slide member 24 in place.

FIG. 5A further illustrates front wall 40 and back wall 42. Front wall 40 and back wall 42 provide opposing boundaries for top slide member 24. In this manner, top slide member 24 may be able to slide to any position within slide channel 38 between front wall 40 and back wall 42.

The embodiment shown in FIG. 5A also illustrates channel 56, which is configured to engage side members 26. Channel 56 is a channel that is positioned in between wings 70. FIG. 5B illustrates a perspective view of the bottom of top member 28. The illustration in FIG. 5B further illustrates channel 56 and wings 70. In the embodiment shown in FIG. 5B, channel 56 may include mounting teeth 58. Mounting teeth 58 may be configured to snapably engage the corresponding mating slot 62 in side member 26, as will be further described in FIGS. 7A-7B.

FIG. 5C illustrates a top-down view of channel 38. This illustration is intended to show the shape of the teeth that line channel 38. In the embodiment shown in FIG. 5C, the teeth of channel 38 are formed by a plurality of semi-circle indentations that are formed along channel 38. Positioned adjacent the semi-circle indentations are flat portions. The semi-circle indentations act as catches to engage the corresponding latch member 64 in top slide member 24, which will be further discussed in FIG. 6B-6D.

In other embodiments any other shape may be used to form the plurality of teeth. For example, the teeth are formed from triangle shapes. In another embodiment, the teeth are formed from rectangular shapes. In yet another embodiment, the teeth are formed from a square shape. In yet another embodiment, the teeth are formed from any full or partial portion of a shape selected from the group consisting of an oval, octagon, pentagon, parallelogram, and trapezoid. In any of the previous embodiments described in this paragraph, channel 38 may or may not contain flat sections, as illustrated in the embodiment of FIG. 5C. In other embodiments, flat sections are replaced by any full or partial portion of a shape selected from the group consisting of a circle, square, rectangle, triangle, oval, octagon, pentagon, parallelogram, and trapezoid. In yet another variation of any of the previous embodiments described, the flat sections are not evenly spaced between the indented shapes in channel 38.

FIG. 5D illustrates a side view of top member 28. FIG. 5D also includes section A-A, which will be further illustrated in FIG. 5E.

FIG. 5E further illustrates Section A-A of top member 28. The embodiment illustrated in FIG. 5E shows mounting teeth 58 as originating from wall 66 in top member 28. Mounting teeth 58 are also contained within channel 56. Mounting teeth 58 are configured to receive the corresponding mating teeth 60 and mating slot 62 in side member 26. Mounting teeth 58 are then configured to lock in place with mating teeth 60 and mating slot 62. In this manner, sidewall 68 of side member 26 may come to rest against wall 66 of top member 28, which is known as an interface of wall 66 and sidewall 68.

The interface of wall 66 and sidewall 68 resists movement between top member 28 and side member 26 along the horizontal direction H. Furthermore, the coupling of mounting teeth 58 with mating slot 62 and mating teeth 60 resists movement between top member 28 and side member 26 along the depth direction Z. As well, wings 70 resist movement between top member 28 and side member 26 along the vertical direction V. In effect, the resistance of movement in the horizontal, vertical, and depth directions H, V, and Z, effectively lock side member 26 in place with top member 28. The lock between these two parts may act to securely retain digital media player 2 in place with respect to the top member 28.

Top member 28 as illustrated in FIGS. 5A-5E may be configured to be any size and/or type of geometry. In addition, top member 28 may be constructed of any type of material. In some embodiments, top member 28 may be molded from acrylonitrile butadiene styrene (ABS) plastic with a hardness of 75 shore D. In other embodiments, top member 28 may be molded from ABS plastic with a hardness of 60 shore D. In further embodiments, top member 28 may be molded from polyurethane with a hardness of 90 shore A. In yet other embodiments, top member 28 may be molded from silicone rubber with a hardness of 95 shore A.

Figure 6A:
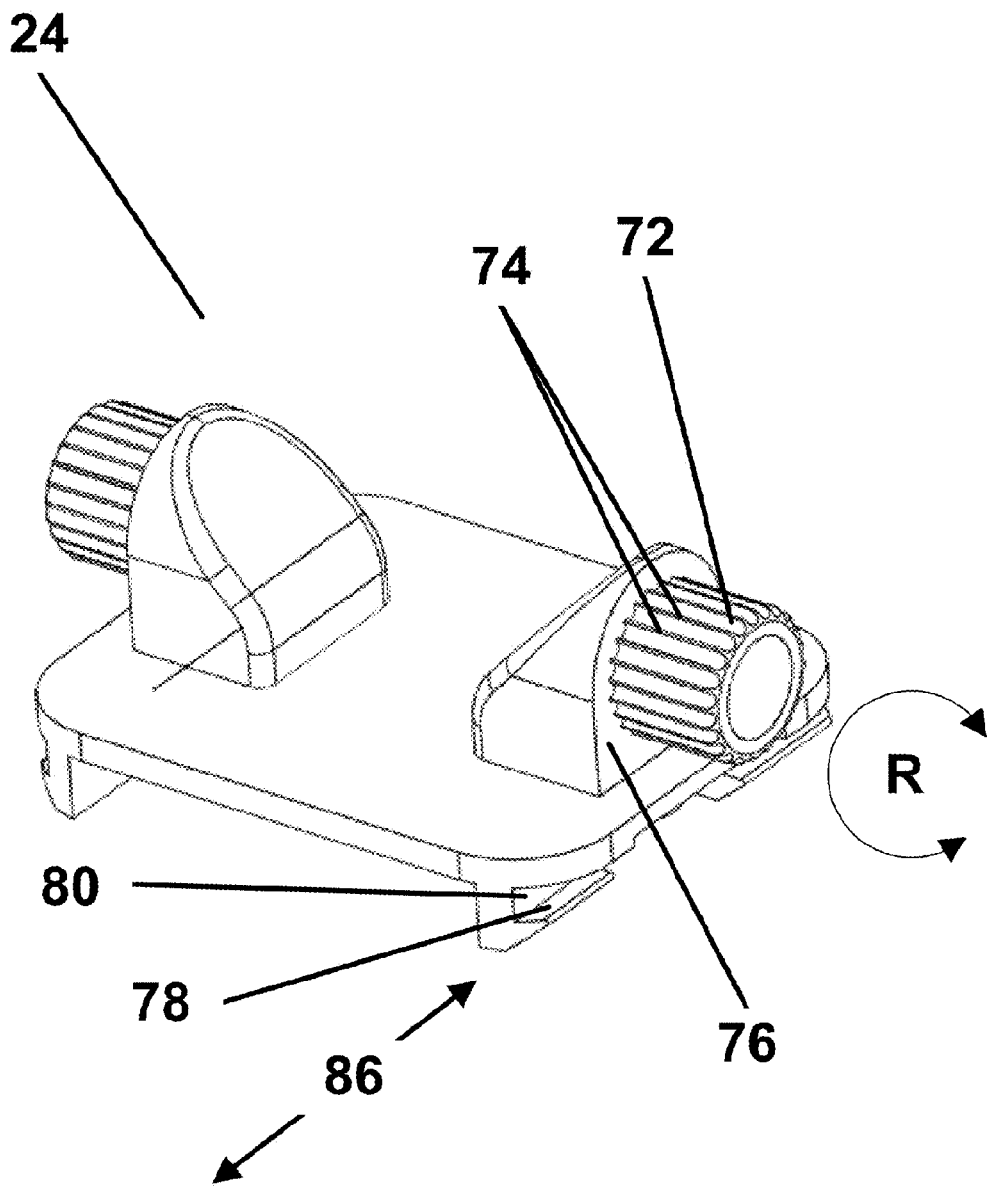
Figure 6A:
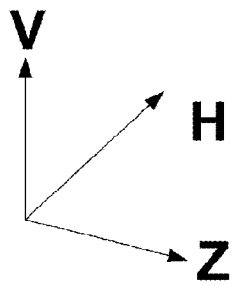

FIG. 6A illustrates a perspective view of top slide member 24. The illustration in FIG. 6A shows top slide member 24 as also including wheels 72, wheelwall 76, rails 78, and rail wall 80. In the embodiment shown in FIG. 6A, wheels 72 may also include teeth 74 that are located around the outer perimeter of wheels 72. Wheels 72 are pivotally coupled to pivot member 22. In this manner, pivot member 22 may be able to pivot in any rotational direction R along wheels 72. When pivot member 22 is coupled with wheels 72, an interior wall of pivot member 22 is positioned so that it abuts or is adjacent to wheelwall 76. Wheelwall 76 both serves as an anchor for wheels 72 and also serves to resist movement of pivot member 22, with respect to top slide member 24, in the direction parallel to the axis of wheels 72.

Wheels 72 also contain a plurality of teeth 74 that are located on the outer perimeter of wheels 72. Teeth 74 may serve to provide friction against pivot member 22 when pivot member 22 is pivoted about wheels 72. Teeth 74 may be configured to provide just enough friction so that the user is able to pivot the pivot member 22 about the longitudinal axis of wheels 72 by hand, as indicated by pivot direction 84. Yet, teeth 74 are still configured to have enough friction to engage pivot member 22 in place, with respect to top slide member 24, thereby resisting further pivoting when the user wishes to retain pivot member 22 in place. For example, teeth 74 are configured to have enough friction, with respect to pivotal movement of pivot member 22, so that pivot member 22 can be isolated at any angle and still thereby support the remaining weight of mounting device 10 and digital media player 2 without moving.

In the embodiment shown in FIG. 6A, teeth 74 comprise the shape of a series of semi-circles. In other embodiments, teeth 74 can take on any variety of shape. For example, teeth 74 can be configured to make up any full or partial portion of the following shapes, including, but not limited to: a circle, square, rectangle, triangle, oval, octagon, pentagon, parallelogram, and trapezoid. In other embodiments, teeth 74 can be a different surface material, such as a rough material, which causes friction with pivot member 22. As such, teeth 74 can be formed of different shapes and/or material types such that they are configured to have proper friction with pivot member 22.

In the embodiment shown in FIG. 6A, wheels 72 contain a plurality of teeth. In other embodiments, wheels 72 may contain fewer teeth, or more teeth. For example, in one series of embodiments, wheels 72 contain 20 or fewer teeth. In another series of embodiments, wheels 72 contain 21 or more teeth.

Top slide member 24 may also include rails 78 and rail walls 80. Rails 78 may engage bottom edge 82 of channel 38 of top member 28. The interface of bottom edge 82 and rails 78 may resist movement of top slide member 24 in the vertical direction V.

Additionally, rail walls 80 may be configured to interface channel 38. The interface between rail walls 80 and channel 38 of top member 28 may resist movement in the depth direction Z. In this manner, the resistance of movement created between rails 78 and bottom edge 82, and rail walls 80 and channel 38 may resist movement of top slide member 24 and top member 28 in the vertical direction V and the depth direction Z. As such, top slide member 24 may then be able to move in the horizontal direction H.

Figure 6B:
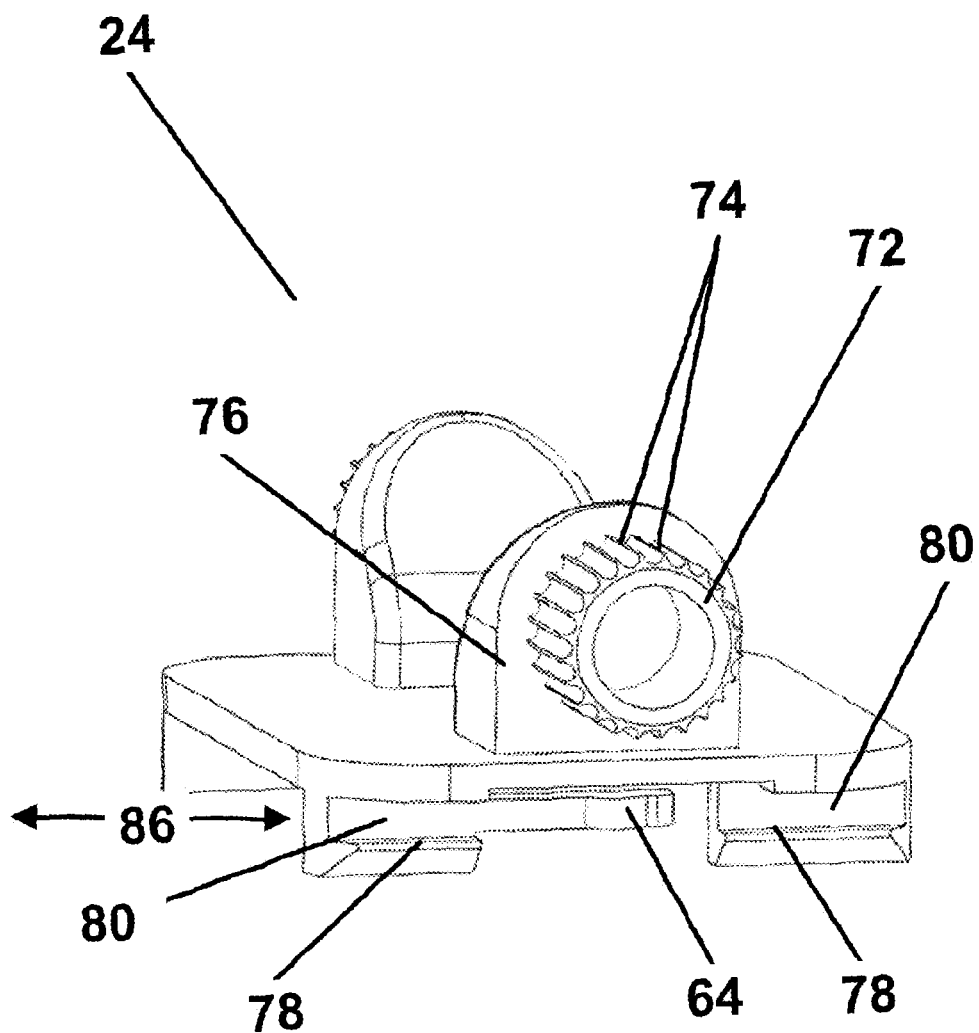
Figure 6B:
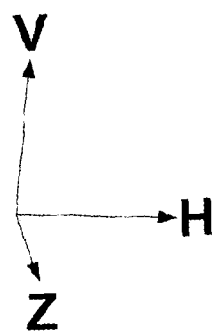

FIG. 6B further illustrates that top slide member 24 may include latch member 64. Latch member 64 may be configured to engage corresponding teeth in channel 38 of top member 28. As previously described, the plurality of teeth in channel 38 may act as catches to engage latch member 64 of top slide member 24. As the plurality of teeth catch latch member 64 this may resist movement of top slide member 24 with respect to the horizontal direction H. In this manner, top slide member 24 may move along channel 38 in the horizontal direction H but then be locked in place with respect to the horizontal direction if the user desires. If the user wants to move latch member 64 along channel 38, the user may only have to apply minimal force against top slide member 24 to unlock the connection between top slide member 24 and top member 28. In this manner, the user may be able to easily unlock top slide member 24 from top member 28, while also enjoying the security of having top slide member 24 locked in place with respect to any direction V, H or Z, if the user desires.

FIG. 6C illustrates a partial side view of top slide member 24. In the embodiment shown in FIG. 6C, latch member 64 is shown to slightly protrude beyond rail wall 80. The protrusion of latch member 64 may engage one or more teeth of the plurality of teeth of channel 38 to lock top slide member 24 in place along the horizontal direction H.

Figure 6D:
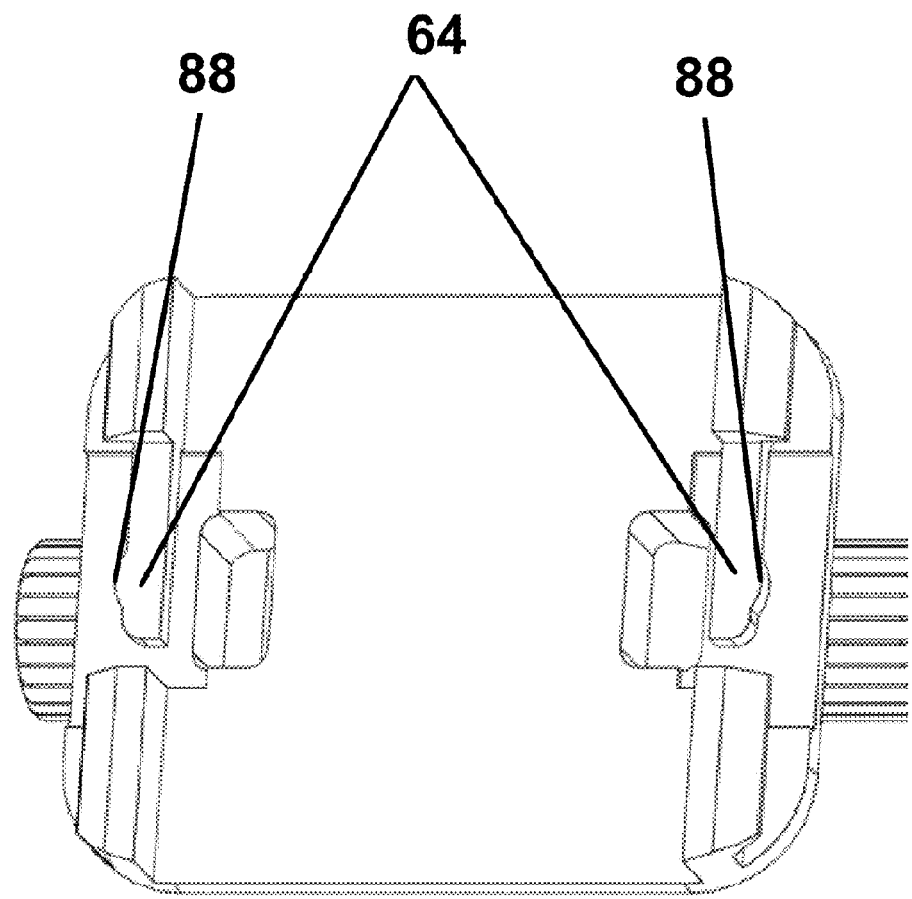
Figure 6D:
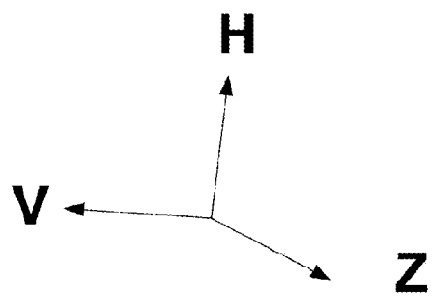

FIG. 6D illustrates a bottom perspective view of top slide member 24. In the embodiment shown in FIG. 6D, latch member 64 is further illustrated as including semi-circle bump 88, which may act to engage one or more teeth of the plurality of teeth of channel 38. In other embodiments, bump 88 may be any full or partial portion of any other shape including, but not limited to the following: a circle, square, rectangle, triangle, oval, octagon, pentagon, parallelogram, and trapezoid.

Extension member 20, pivot member 22, and top slide member 24 may be configured to be any size and/or type of geometry. In addition, extension member 20, pivot member 22, and top slide member 24 may be constructed of any type of material. In some embodiments, one or more of the three may be molded from acrylonitrile butadiene styrene (ABS) plastic with a hardness of 75 shore D. In other embodiments, one or more may be molded from ABS plastic with a hardness of 60 shore D. In further embodiments, one or more may be molded from polyurethane with a hardness of 90 shore A. In yet other embodiments, one or more may be molded from silicone rubber with a hardness of 95 shore A.

FIG. 7A illustrates a bottom-up view of side members 26. In the embodiment shown in FIG. 7A, side members 26 further include mating teeth 60, mating slot 62, and sidewall 68, which extends perpendicular in to the page along the vertical direction V. Mating teeth 60 and mating slot 62 may be configured to engage and lock in place with mounting teeth 58 of top member 28. The locking between mounting teeth 58 with mating teeth 60 and mating slot 62 may create a lock, which locks side members 26 with respect to top member 28. It should be appreciated that any use of the word "lock" or "locking" may refer to either a temporary lock, which can be unlocked, or a permanent lock, may not be unlocked.

To engage the lock between side members 26 and top member 28, the user may slide sidewall 68 of side member 26 into channel 56 of top member 28 along the horizontal direction H or depth direction Z. Once sidewall 68 is received within channel 56, the user may cause side member 26 to move along the vertical direction V up towards extension member 20. Sidewall 68 may move so that it interfaces wall 66 of top member 28. Once wall 66 and sidewall 68 have mated, the user may then cause side member 26 to move so that its perimeter abuts the corresponding perimeter of top member 28. Once side member 26 is in place, the user may then cause side member 26 to move down along the vertical direction V away from extension member 20, which may cause mating teeth 60 and mating slot 62 to engage mounting teeth 58, thereby locking side member 26 in place with respect to top member 28. It should also be appreciated that the side members 26 may engage and lock top member 28 in any way that is able to create a temporary or permanent lock. In some embodiments, side members 26 snap in to top member 28 to create a mechanical interference that resists movement, which may effectively lock side members 26 to top member 28.

To unlock side members 26 from top member 28, the user may cause side member 26 to move along the vertical direction V in the direction toward extension member 20, while keeping top member 28 fixed in place. This movement may cause mating teeth 60 and mating slot 62 to disengage from mounting teeth 58 on top member 28, which may then allow side member 26 to slide free of top member 28. It should also be appreciated that side members 26 may be unlocked from top member 28 in any other way. In some embodiments, side members 26 unsnap from top member 28 to unlock.

FIG. 7B illustrates a perspective view of side members 26. FIG. 7B further illustrates retention wall 90. Retention wall 90 may be formed at the back end of side member 26 (along the horizontal direction H) adjacent to backside opening 36. Retention wall 90 may be configured to securely retain digital media player 2 so that digital media player 2 does not slide out of backside opening 36. In the embodiment shown in FIG. 7B, retention wall 90 may be formed by a curved wall section. The curved wall section, as shown in the embodiment illustrated in FIG. 7B, is formed as outside wall 92 runs parallel to sidewall 68 and then curves in the toward the depth direction Z. The curved section may be configured to define retention wall 90. In other embodiments, the curved section may be formed from any size curve. In yet other embodiments, retention wall 90 may be formed by any other shape. For example, retention wall 90 may be formed by a right angle, such as the corner of a square, or any other shape that would act to securely retain digital media player 2. In some embodiments there may be no retention wall 90.

In some embodiments, outside walls 92 and/or retention walls 90 only cover a small portion of digital media player 2. Several embodiments include outside walls 92 and/or retention walls 90 that are only 1 inch wide even though the digital media players that fit inside several embodiments can be much wider than 2 inches. In some embodiments, an outside wall 92 covers approximately 20% of the corresponding side of a digital media player 2. In several embodiments, an outside wall covers approximately 80% of the corresponding side of a digital media player 2. It should be appreciated that the outside walls 92 may cover any portion of a side of digital media player 2 between 0-100%.

Side member 26 may be configured to be any size and/or type of geometry. In addition, side member 26 may be constructed of any type of material. In some embodiments, side member 26 may be molded from acrylonitrile butadiene styrene (ABS) plastic with a hardness of 75 shore D. In other embodiments, side member 26 may be molded from ABS plastic with a hardness of 60 shore D. In further embodiments, side member 26 may be molded from polyurethane with a hardness of 90 shore A. In yet other embodiments, side member 26 may be molded from silicone rubber with a hardness of 95 shore A.

It should also be appreciated that some embodiments only include one side member 26, which may be referred to as a tray, such as the tray disclosed in U.S. patent application Ser. No. 13/278,759 and U.S. patent application Ser. No. 13/332,373, which has been incorporated by reference. In this manner, the tray may receive any size, shape, or type of digital media player 2 and the tray may then be further coupled to any other component, such as those illustrated in this disclosure. In some embodiments, the tray does not include any other components and is coupled to any location on screen 6.

FIG. 8A illustrates digital media player 2 coupled to mounting device 10, which is further coupled to screen 6. In the embodiment shown in FIG. 8A, mounting device 10 and digital media player 2 may be coupled adjacent to bottomside 16 of screen 6. In this manner, if the user is positioned facing screenside 8 of screen 6, the user may have direct line of sight to digital media player 2 and mounting device 10. In other embodiments, not shown, mounting device 10 may be coupled to any location along the perimeter of screen 6. In this manner, mounting device 10 may be coupled any location along topside 18, bottomside 16, first side 94, or second side 96 of screen 6. In these embodiments, mounting device 10 may be coupled to backside 12, screenside 8, topside 18, bottomside 16, first side 94, or second side 96 of screen 6.

The direct line of sight configuration may allow the user to have improved connectivity between a remote control device and digital media player 2. This configuration may also increase accessibility to digital media player 2. In addition, this embodiment may eliminate the need for the user to drill a hole in a wall that is adjacent to screen 6 in order to run cables behind the wall or to install a shelf for digital media player 2.

Figure 8B:
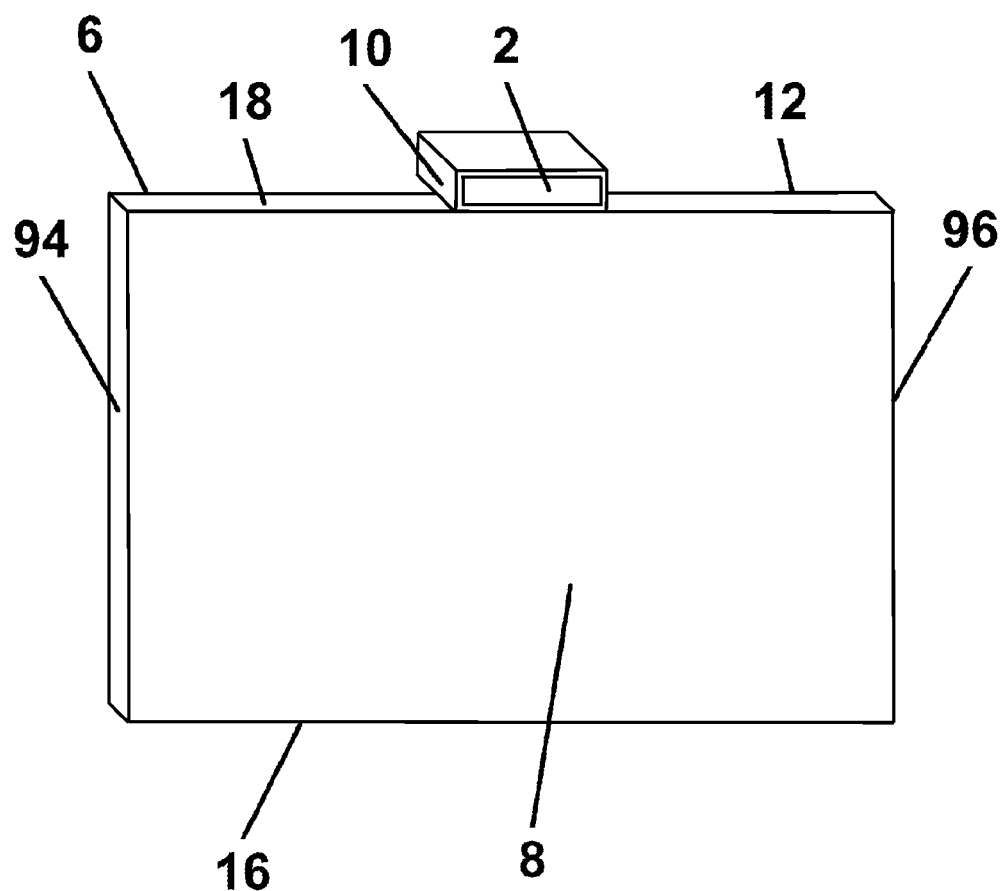
Figure 8B:
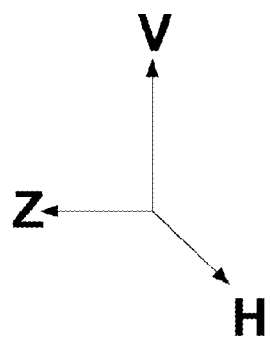

FIG. 8B illustrates the embodiment of mounting device 10 from FIG. 8A, but in this illustration, mounting device 10 is mounted to topside 18 of screen 6. In the illustration of FIG. 8B, mounting device 10 and digital media player 2 are coupled adjacent to topside 18 of screen 6. FIGS. 8A and 8B illustrate two of the many ways that mounting device 10 alone or coupled with digital media player 2 may be coupled to screen 6.

Mounting device 10 may also be configured to couple to any screen 6. This aspect of mounting device 10 may have wide commercial appeal to users. In some embodiments, mounting device 10 may be a one-size fits all device, because the mounting device 10 may be coupled to any type, size, style or manufacturer of digital media player 2. The user may then further couple mounting device 10 and digital media player 2 to any type, size, style, or manufacturer of screen 6, as previously described. In other embodiments, mounting device 10 may be designed specifically for coupling with one or a limited type of digital media player 2. For example, a mounting device 10 may be configured to only be coupled with Apple TV. Although, in this manner, mounting device 10 may still be coupled to any type, size, style, or manufacturer of screen 6.

In yet other embodiments, mounting device 10 may be configured to couple with all digital media players manufactured by one manufacturer. For example, one mounting device 10 may be configured to couple with any model of Roku digital media player 2. In this embodiment, mounting device 10 may still be configured to couple with any type, size, style, or manufacturer of screen 6. In yet even further embodiments, mounting device 10 may be configured to couple with several different models and/or brands of digital media players. Again, in this embodiment mounting device 10 may be configured to couple to any type, size, style, or manufacturer of screen 6.

Mounting device 10 may be configured to couple to screen 6 in a number of different ways. In some embodiments, extension member 20 is coupled to backside 12 of screen 6 via adhesive. In other embodiments, extension member 20 is coupled to backside 12 via coupling means, such fabric hook-and-loop fasteners, one or more magnets, or screws that are threaded into backside 12. In other embodiments, extension member 20 is coupled to backside 12 via any combination of the previously mentioned coupling means. In yet other embodiments, extension member 20 is coupled to backside 12 of screen 6 via one or more hooks, like the hooks disclosed in U.S. patent application Ser. No. 13/278,759 and U.S. patent application Ser. No. 13/332,373.

In yet further embodiments, mounting device 10 is coupled to backside 12 by coupling any of the previously mentioned coupling means to any other component on mounting device 10, such as pivot member 22, top slide member 24, side member 26, or top member 28. In other embodiments, extension member 20, pivot member 22, top slide member 24, side member 26, or top member 28 may be coupled to a wall that is adjacent to screen 6 or a stand that is coupled to screen 6, such as a television stand, or a computer monitor stand.

Figures 9I, 9J:
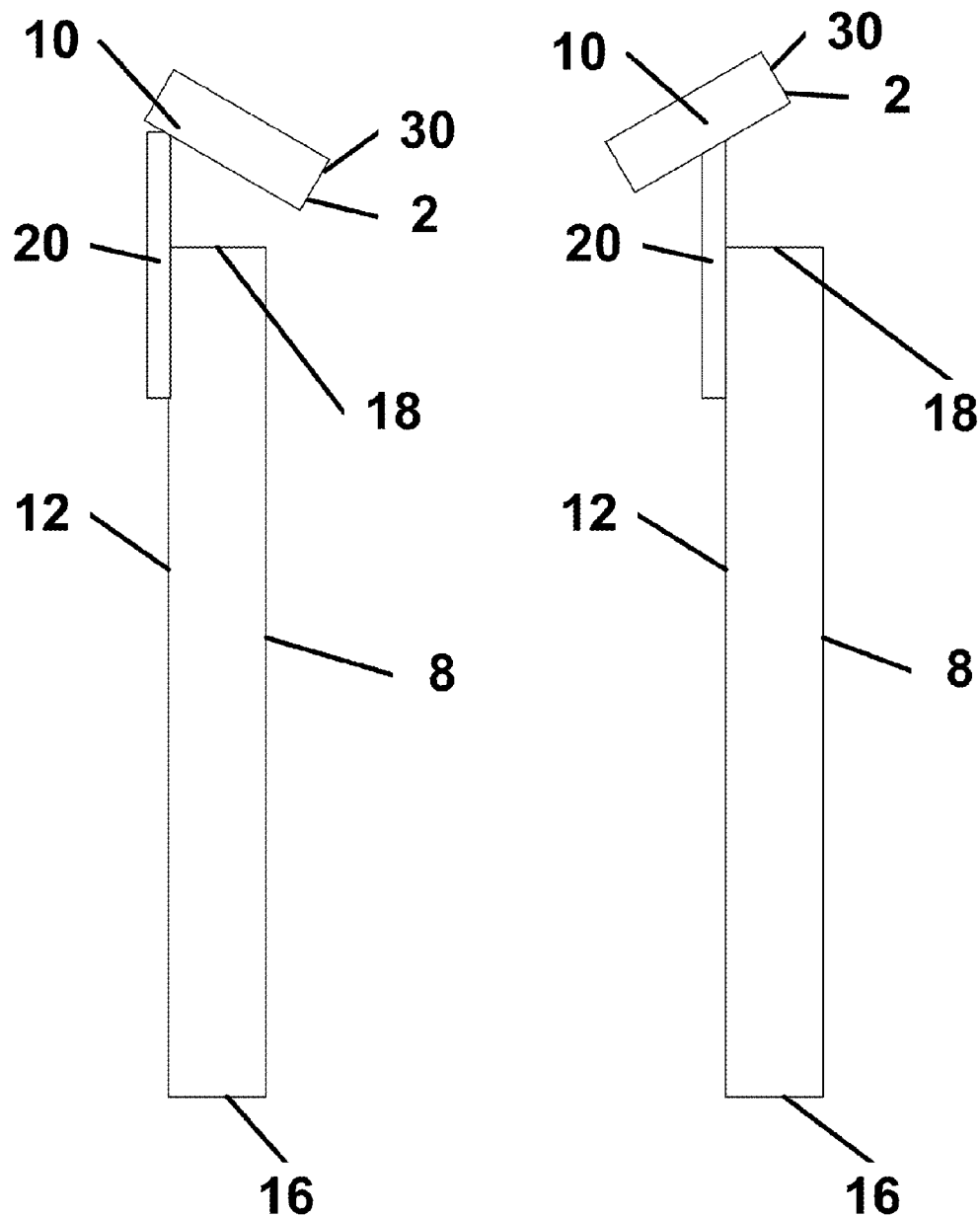

FIGS. 9A-9J illustrate various embodiments where the digital media player is positioned along the bottomside of the screen or along the topside of the screen. FIGS. 9A-9B illustrate a side view of screen 6 with mounting device 10 and digital media player 2 coupled adjacent bottomside 16 of screen 6. FIG. 9A illustrates mounting device 10 coupled to screen 6 adjacent to bottomside 16. In another configuration of the embodiment from FIG. 9A, FIG. 9B shows mounting device 10 configured such that it is vertically offset from bottomside 16 along the vertical direction V away in the direction opposite the topside 18. In this manner, mounting device 10 may be positioned at any vertical location along extension member 20 along the vertical direction V.

Positioning the digital media player 2 along the bottomside 16 means placing the digital media player 2 in close proximity to the bottomside 16. In some embodiments, "along" means within 10 inches, within 5 inches, within 3 inches, or within 1 inch of the bottomside 16. Some embodiments include positioning the digital media player 2 such that it abuts the bottomside 16.

Positioning the digital media player 2 along the topside 18 means placing the digital media player 2 in close proximity to the topside 18. In some embodiments, "along" means within 10 inches, within 5 inches, within 3 inches, or within 1 inch of the topside 18. Some embodiments include positioning the digital media player 2 such that it abuts, or touches the topside 18.

To achieve the vertical offset, the user may extend extension member 20 until mounting device 10 reaches its desired vertical offset along the vertical direction V. In addition, mounting device 10 may be configured to allow the user to vertically offset mounting device 10 along the vertical direction V in other ways, such as by coupling extension member 20 to screen 6 at a different vertical position. In this manner, the user may achieve the same vertical offset without having to extend extension member 20. It should also be appreciated that the user may perform any of these vertical offset techniques in combination to adjust the vertical offset along the vertical direction V to the user's liking.

FIGS. 9C-9D illustrate another side view of screen 6, but this time with mounting device 10 and digital media player 2 coupled adjacent to topside 18 of screen 6. As previously mentioned, mounting device 10 may be configured to be coupled to any location on screen 6. In the embodiment shown in FIG. 9C, mounting device 10 is coupled to screen 6 adjacent to topside 18. In this manner, extension member 20 may be coupled to backside 12 of screen 6 such that mounting device 10 abuts the topside 18, or is adjacent to topside 18.

It should also be appreciated that some embodiments do not include extension member 20. In this manner, the mounting device 10 may be similar to trays disclosed in U.S. patent application Ser. No. 13/278,759 and U.S. patent application Ser. No. 13/332,373. In order to mount the tray adjacent to topside 18, the tray may be configured to couple to either the backside 12, topside 18, screenside 8 or any combination of the three. In order to mount the tray adjacent to bottomside 16, the tray may be configured to couple to either backside 12, screenside 8 or any combination of the three.

FIG. 9D illustrates an embodiment of the mounting device 10, but this time extension member 20 may be extended so that mounting device 10 and digital media player 2 are vertically offset from topside 18 along the vertical direction V in the direction opposite bottomside 16. Again, as previously mentioned, mounting device 10 may be configured to allow the user to vertically offset mounting device 10 from screen 6 in a number of ways, such as by extending extension member 20 or coupling extension member 20 to screen 6 at a different vertical position.

FIGS. 9E-9F illustrate another configuration of mounting device 10 with respect to screen 6. Mounting device 10 may be configured to be positioned at any horizontal location along horizontal direction H. In this manner, the user may horizontally adjust mounting device 10 so that frontside opening 30 is horizontally offset at any position with respect to screenside 8. In this manner, the user may horizontally adjust mounting device 10 so that frontside opening 30 is flush with screenside 8. In addition, mounting device 10 may be horizontally adjusted so that frontside opening 30 is positioned to the front of screenside 8, as illustrated in FIG. 9E. Mounting device 10 may also be horizontally adjusted so that frontside opening 30 is positioned to the rear or front of screenside 8, as illustrated in FIG. 9F.

FIGS. 9G-9H illustrate that mounting device 10 may be configured to be simultaneously horizontally offset and vertically offset from screen 6. FIG. 9G illustrates that mounting device 10 may be fully vertically offset with respect to topside 18 and fully horizontally offset such that frontside opening 30 of mounting device 10 is horizontally offset to the front of screenside 8 of screen 6. FIG. 9H also illustrates the rearward horizontal offset. In the embodiment shown in FIG. 9H, mounting device 10 may be fully vertically offset with respect to topside 18 and fully horizontally offset such that frontside opening 30 is horizontally offset to the rear of screenside 8. "Fully" in the context of this disclosure means to the maximum allowed. The maximum can either be the maximum determined by mounting device 10, screen 6, or the structure (such as a wall) to which screen 6 is adjacent.

While the illustration in FIGS. 9G-9H only illustrate the simultaneous vertical and horizontal offset when coupled adjacent to topside 18 of screen 6, mounting device 10 is not limited to this one configuration. Mounting device 10 may be simultaneously vertically and horizontally offset when mounting device 10 is coupled adjacent to bottomside 16, or when mounting device 10 is coupled to any other location on screen 6.

FIGS. 9I-9J illustrate that mounting device 10 may also be configured to be horizontally offset, vertically offset, and pivotally offset from screen 6. Similar to the illustration in FIG. 9G, FIG. 9I illustrates that mounting device 10 may be fully vertically offset with respect to topside 18 and fully horizontally offset such that frontside opening 30 of mounting device 10 is horizontally offset to the front of screenside 8, and even further that mounting device 10 may be configured to be pivotally offset such that frontside opening 30 of mounting device 10 is pivoted down toward the direction of bottomside 16. In this manner, the user may be able to fully customize the position of mounting device 10 to their liking. For example, in the illustration shown in FIG. 9I, mounting device 10 may be pivotally offset so that mounting device 10 and digital media player 2 are aimed down toward the user. While not shown, it should also be appreciated that the mounting device 10 may be configured to maintain the same vertical offset and horizontal offset as shown in FIG. 9I, but instead be aimed up in the direction opposite bottom side 16, similar to the pivotal offset illustrated in FIG. 9J.

FIG. 9J illustrates yet another configuration of mounting device 10. Similar to the illustration in FIG. 9H, FIG. 9J illustrates that mounting device 10 may be fully vertically offset with respect to topside 18 of screen 6 and fully horizontally offset such that frontside opening 30 of mounting device 10 is horizontally offset to the rear of screenside 8, and even further that mounting device 10 may be configured to be pivotally offset such that frontside opening 30 of mounting device 10 is pivoted up in the direction opposite bottomside 16. While not shown, it should also be appreciated that the mounting device 10 may be configured to maintain the same vertical offset and horizontal offset as shown in FIG. 9J, but instead be aimed down in the direction towards bottom side 16, similar to the pivotal offset illustrated in FIG. 9I.

While FIGS. 9I-9J only show two possible configurations of mounting device 10 being horizontally, vertically, and pivotally offset with respect to screen 6, it should be noted that any combination of horizontal, vertical, and pivotal offset is possible. Furthermore, any of these combinations of offsets may be possible when mounting device 10 is coupled to any location on screen 6, including adjacent to bottomside 16 of screen 6.

In some embodiments, arm is extension member 20. In other embodiments, arm is any other type of arm that is configured to couple to screen 6. In this manner, arm may be coupled to topside 18, bottomside 16, first side 94, or second side 96 of screen 6. In this manner, mounting device 10 may be configured such that digital media player 2 is positioned along topside 18, bottomside 16, first side 94, or second side 96 of screen 6. It should be appreciated that mounting device 10 may be coupled at any place on screen 6, such that digital media player 2 may be positioned at any location along the perimeter of screen 6.

Figure 10:
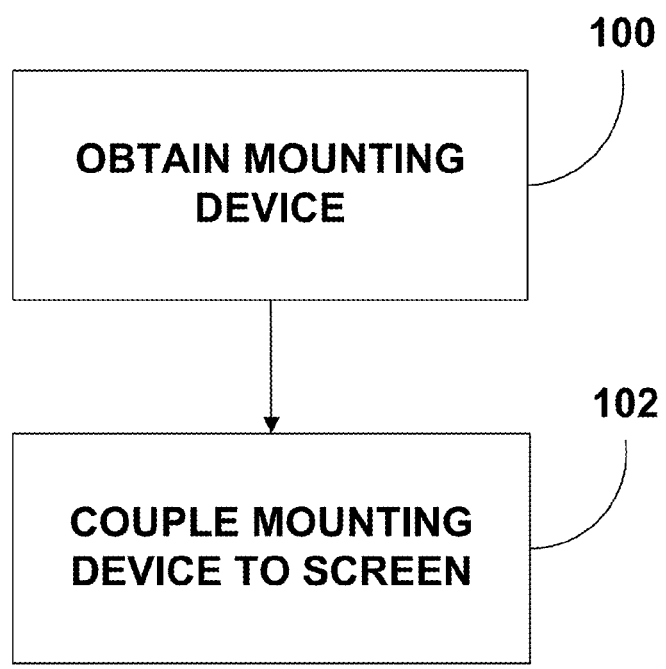
FIG. 10 is a flow-chart showing a method of coupling mounting device to the screen.

FIG. 10 is a flowchart illustrating a method for coupling mounting device 10 to screen 6. The structure recited in the discussion of FIGS. 10-13 may be the structure illustrated and described in FIGS. 1-9J. In the embodiment shown in FIG. 10, the user obtains mounting device 10 (100). The flowchart shows that the user causes mounting device 10 to be coupled to any location on screen 6 (102).

Figure 11:
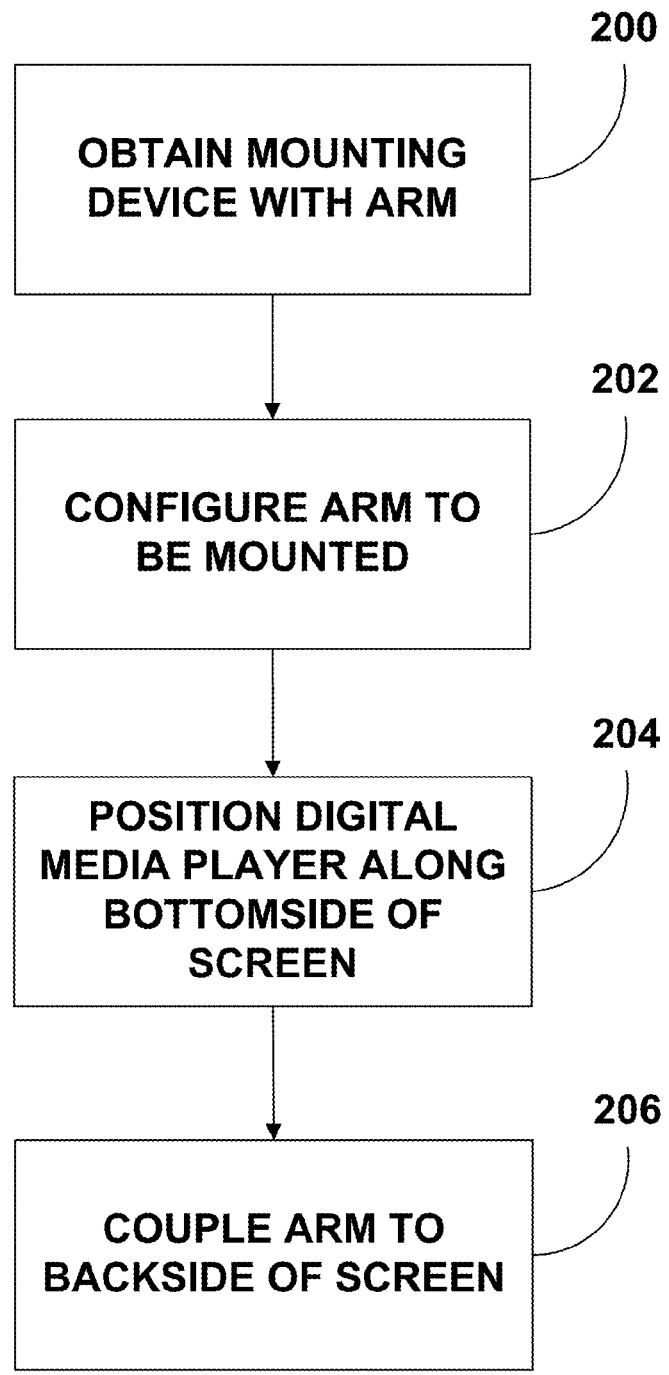
FIG. 11 is a flow-chart showing a method of coupling mounting device to a backside of the screen.

FIG. 11 illustrates a flow chart showing a method for coupling a digital media player 2 to a screen 6 with a backside 12, a screenside 8, a bottomside 16, and a topside 18. In the embodiment, the user obtains a mounting device 10 with a base portion and at least two outside walls (200). The base portion and the two outside walls may be configured to hold the digital media player 2. The mounting device 10 may further comprise an arm that is configured to couple the mounting device 10 to the screen.

The user may configure an arm of the mounting device 10 so it protrudes away from the base portion in a vertical direction V (202). The user may position the digital media player 2 along the bottomside 16 of the screen (204). The digital media player 2 may be oriented in an approximately horizontal direction while the mounting device 10 is holding the digital media player 2. The user may couple the arm to the backside 12 of the screen such the arm is positioned above the digital media player (206).

In some embodiments, the method further includes adhering the arm to the backside 12 of the screen 6. In some embodiments, the backside 12 comprises a vent 14 and the method further includes hooking the arm to the vent 14. In other embodiments, the backside 12 comprises a threaded hole 17 and the method includes coupling the arm to the threaded hole 17.

In some embodiments, the mounting device 10 has a frontside retention member 32 and the method further includes the step of moving the frontside retention member 32 relative to the base portion while inserting the digital media player 2 into the mounting device 10. In some embodiments, the method further includes extending the arm such that an overall length of the arm becomes longer with respect to a first length of the arm. In some embodiments, the arm has a lower portion that is coupled to the base portion and the method further includes sliding the lower portion relative to the base portion. In some embodiments, the method further includes rotating the arm relative to the base portion. In this manner, the arm may be configured to rotate to various angles as previously described.

Furthermore, in some embodiments, the method also includes coupling the arm to the backside 12 of the screen 6 such that at least a portion of the digital media player 2 is visible from a viewing position that is oriented directly at the screenside 8 of the screen 6 and located ten feet from the screenside 8. In some embodiments, the digital media player 2 has a remote sensor configured to receive signals from a remote control and the method further comprising coupling the arm to the backside 12 of the screen 6 such that at least the remote sensor is visible from a viewing position that is oriented directly at the screenside 8 of the screen 6 and located ten feet from the screenside 8.

In some embodiments the vertical direction is parallel to a fourth direction V1, which is within plus or minus forty degrees of vertical direction V. In other embodiments, the fourth direction V1 is positioned at any angle within vertical direction V and horizontal direction H.

In some embodiments, the method further includes positioning the digital media player 2 five inches or less below the bottomside 16 of the screen 6. In some embodiments, the digital media player 2 has a bottom surface and side surfaces. In some of these embodiments, the bottom surface is larger than the side surfaces and the method further comprising orienting the bottom surface within plus or minus thirty degrees of horizontal.

Figure 12:
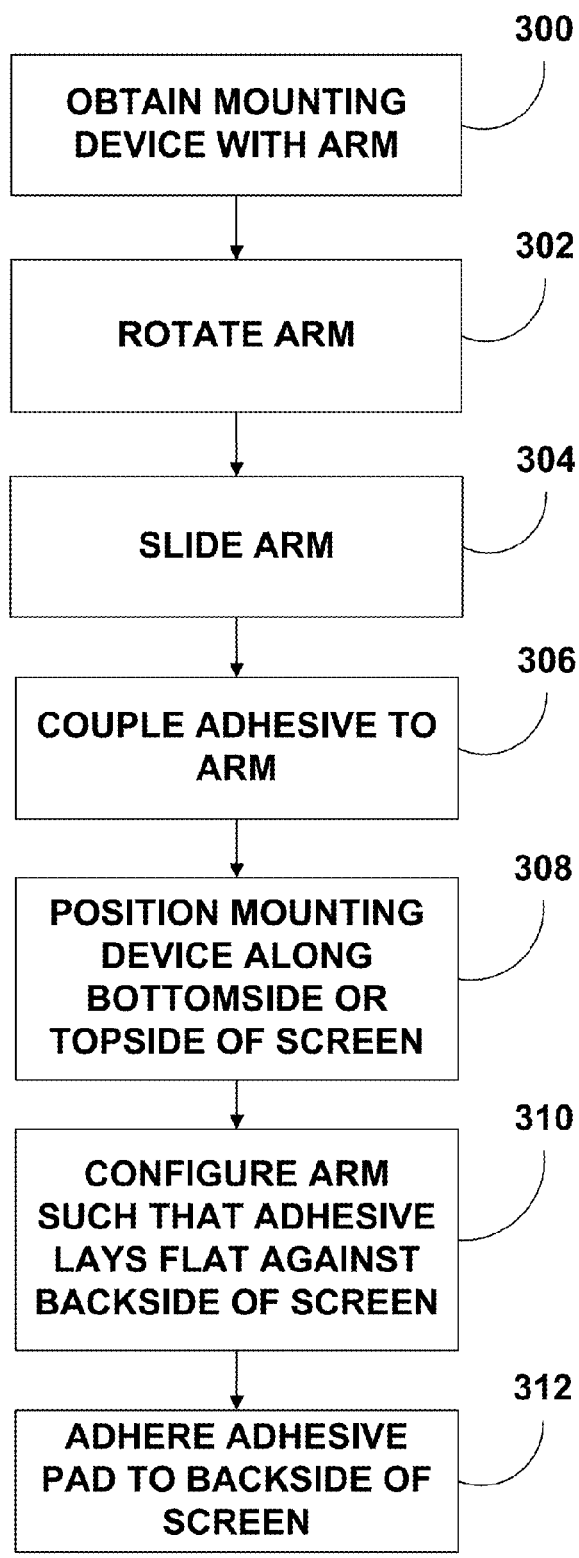
FIG. 12 is a flow-chart showing a method of coupling mounting device to a bottomside or a topside of the screen.

FIG. 12 illustrates a flowchart showing another method for coupling a digital media player 2 to a screen 6 with a backside 12, a screenside 8, a bottomside 16, and a topside 18. The method includes obtaining a mounting device 10 with a base portion and at least two outside walls (300). The base portion and the two outside walls are configured to hold the digital media player 2. The mounting device 10 further includes an arm that is configured to couple the mounting device 10 to the screen. The method includes rotating the arm relative to the base portion such that the arm protrudes away from the base portion (302). The method also may include sliding the arm relative to the base portion such that the arm moves relative to the base portion (304). The method may also include coupling an adhesive pad to the arm (306). The adhesive pad may comprise a cover. In other embodiments, method step 306 is optional, because the adhesive pad may already be coupled to the arm. The method also may include positioning the mounting device 10 along the bottomside 16 or along the topside 18 of the screen (308). The method may also include configuring the arm such that the adhesive pad lays approximately flat against a portion of the backside 12 of the screen 6. Furthermore, the method may include adhering the adhesive pad to the backside 12 of the screen 6.

In some embodiments, the arm has an overall length and the method further includes extending the arm such that the overall length of the arm becomes longer with respect to a first length of the arm. In some embodiments, the method may further include positioning the mounting device 10 along the bottomside 16 or along the topside 18 of the screen 6 such that the base portion is oriented approximately parallel to horizontal direction H.

In some embodiments, the method further includes deforming a portion of the mounting device 10 while inserting the digital media player 2 into the mounting device 10, wherein the portion that deforms is configured to at least partially secure the digital media player 2 to the mounting device 10. In some of these embodiments, the portion that deforms is a frontside retention member 32.

Figure 13:
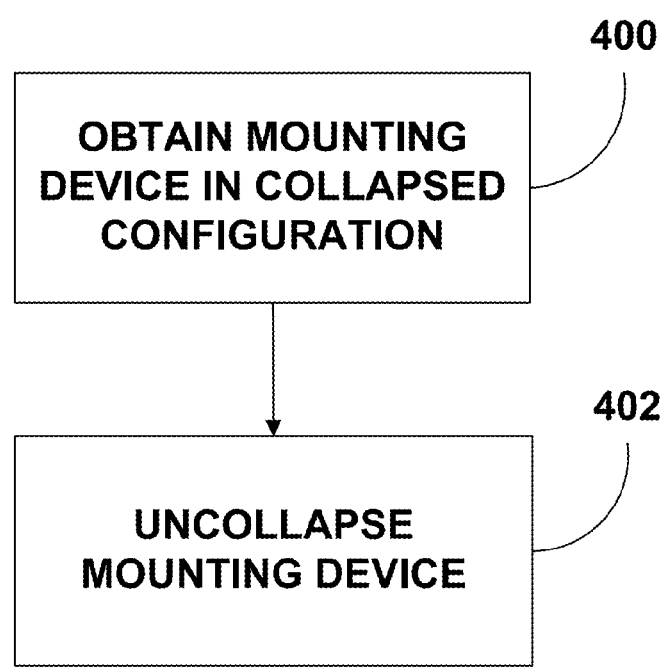
FIG. 13 is a flow-chart showing a method of uncollapsing the mounting device.

FIG. 13 illustrates a flowchart showing another method for coupling a digital media player 2 to screen 6 with a backside 12, a screenside 8, a bottomside 16, and a topside 18. The method may include obtaining a mounting device 10 in a collapsed configuration (400). The mounting device 10 may comprise a base portion and at least two outside walls. The base portion and the two outside walls may be configured to hold the digital media player 2. The mounting device 10 may further comprise an arm that is configured to couple the mounting device 10 to the screen 6. The method may also include uncollapsing the mounting device 10 by rotating the arm relative to the base portion (402). The method may also include sliding the arm towards a middle of the base portion and extending the arm such that an overall length of the arm becomes longer.

In some embodiments, the arm has an adhesive surface and the method further includes adjusting the arm such that the adhesive surface is approximately flat against the backside 12. The method may also include adhering the adhesive surface to the backside 12 of the screen 6 and holding the digital media player 2 with the mounting device 10 while the mounting device 10 is adhered to the backside 12 and while the digital media player 2 is located along the bottomside 16 or along the topside 18 of the screen 6.

Adhere means to hold fast or stick by gluing, suction, grasping, or fusing or as if by gluing, suction, grasping, or fusing. Some adhesive pads include foam adhesive that can be cut to various shapes such as rectangles and circles. Not all adhesive pads include padding. Adhesive pads can include double-sided tape and/or a bonding agent such as glue or a suction cup. Adhesive pads can cause permanent or temporary adhesion.

In some embodiments, outside walls and/or retention walls only cover or hold a small portion of a digital media player 2. Several embodiments include outside walls and/or retention walls that are only 1 inch wide even though the digital media players that fit inside several embodiments can be much wider than 2 inches. In some embodiments, an outside wall covers approximately 20% of the corresponding side of a digital media player 2. In several embodiments, an outside wall covers approximately 80% of the corresponding side of a digital media player 2.

FIGS. 5A-5E illustrate various views of top member 28. The top member 28 is one embodiment of a base portion. A base portion couples one outside wall to another outside wall. In some embodiments, the outside walls are oriented roughly perpendicular to the base portion (as illustrated in FIG. 3). Mounting devices are not always oriented such that top members 28 are oriented near a top portion of the mounting devices. The base portion and the two outside walls can be configured to hold the digital media player 2.

Positioning the digital media player 2 along the bottomside 16 of the screen 6 means placing the digital media player 2 in close proximity to the bottomside 16. In some embodiments, "along" means within 10 inches, within 5 inches, within 3 inches, or within 1 inch of the bottomside 16. Some embodiments include positioning the digital media player 2 such that it touches the bottomside 16 of the screen 6.

Positioning the digital media player 2 along the topside 18 of the screen 6 means placing the digital media player 2 in close proximity to the topside 18. In some embodiments, "along" means within 10 inches, within 5 inches, within 3 inches, or within 1 inch of the topside 18. Some embodiments include positioning the digital media player 2 such that it touches the topside 18 of the screen 6.

Orienting a digital media player 2 approximately horizontally means orienting the digital media player 2 within plus or minus forty degrees of horizontal in relation to the bottomside 16 of the screen 6. Some embodiments include orienting a digital media player 2 within plus or minus thirty degrees of horizontal in relation to the screen 6. Several embodiments include orienting a digital media player 2 within plus or minus fifteen degrees of horizontal in relation to the bottomside 16 of the screen 6.

FIG. 2 includes a backside 12 of the screen 6 that has a threaded hole 17. Some embodiments include coupling the arm to the threaded hole 17. For example, the user can pass a screw through a hole in the arm and then into the threaded hole 17.

FIG. 4A illustrates a frontside retention member 32 that is configured to hold a digital media player 2 inside the mounting device 10. In some embodiments, the frontside retention member 32 protrudes away from the top member 28 such that the frontside retention member 32 covers a portion of the digital media player 2. The frontside retention member 32 can be a cantilever beam configured to flex or deform. The portion that protrudes away from the top member 28 can be oriented within plus or minus 20 degrees of perpendicular to the cantilever beam.

FIG. 4A also illustrates side members 26 that define at least a portion of the mounting device 10 that is narrower than the digital media player 2. As a result, inserting the digital media player 2 into the mounting device 10 deforms the side members 26 by pushing the side members 26 farther apart. The friction caused by deforming the mounting device 10 at least partially secures the digital media player 2 inside the mounting device 10.

FIG. 4A illustrates the mounting device 10 in a collapsed configuration. FIG. 4C illustrates the mounting device 10 as the arm is being slid towards a middle portion of the base portion to uncollapse the mounting device 10. FIGS. 4B and 4C illustrate that extending the arm can increase an overall length of the arm. Some embodiments include arms that do not extend.

Protruding away from the base portion in a vertical direction does not necessarily mean the arm is perpendicular to the base portion. Any direction that is out of the plane defined by the base portion can be a vertical direction, as defined by fourth direction V1. In some embodiments, the fourth direction V1 is within plus or minus 40 degrees of being perpendicular to the base portion.

Adjustable means capable of being adjusted or capable of being offset with respect to a side of the screen. Adjustable also means that the mounting device may change so that it fits, corresponds, conforms, adapts, or accommodates any screen or structure adjacent to the screen.

It should be appreciated that any of the method steps illustrated in FIGS. 10-13 are optional and may be performed in any order with respect to each other. Steps from different method embodiments can be combined.

The above description is intended to be illustrative, and not restrictive. As such, the above embodiments and aspects thereof may be used in combination with each other. Many other embodiments will be apparent to those skilled in the art after reading the above description. While the foregoing written description of the invention enables one of ordinary skill to make and use the claimed invention, those of ordinary skill will understand and appreciate the existence of variations, permutations, combinations, equivalent means, and equivalents of the specific embodiments, methods, and examples herein. The invention should therefore not be limited by the above described embodiments, methods, and examples, but by all embodiments and methods within the scope and spirit of the invention as claimed.

The following is claimed:

1. A system for coupling a digital media player to a television having a topside surface, a bottomside surface that is opposite the topside surface, a backside surface, and a frontside surface, wherein the frontside surface is configurable to display images based on digital signals from the digital media player, wherein a remote control device is configured to communicate with the digital media player, the system comprising:

a tray that supports the digital media player, the tray having a frontside, a backside, and a base, wherein a first sidewall is coupled to the base and a second sidewall is coupled to the base of the tray, wherein the first sidewall and the second sidewall protrude away from the base, wherein at least a portion of the digital media player is located between the first sidewall and the second sidewall, wherein at least a portion of the base is located above the topside surface of the television, and wherein at least a first portion of the tray is located above the topside surface of the television while the tray supports the digital media player at least partially above the topside surface of the television, the tray comprising a frontside opening located in the frontside of the tray, wherein the frontside opening is capable of providing line of sight between the digital media player and the remote control device, wherein the digital media player comprises a frontside end, and the frontside opening of the tray at least partially exposes the frontside end of the digital media player, and the tray comprising a backside opening located in the backside of the tray, wherein an electrical cable is coupled to the digital media player and the electrical cable exits the digital media player and passes through the backside opening in the backside of the tray; and an arm coupled to the tray, wherein the arm is configured to couple the tray to the television, wherein the arm is coupled to the backside surface of the television so that the arm protrudes downward from the tray such that the tray supports the digital media player at least partially above the topside surface of the television, wherein the arm comprises a first length, a first width, and a first thickness, wherein the first length is measured from a distal end of the arm to a location at which the arm is coupled to the tray, wherein the first thickness is measured directly outward from the backside surface of the television while the arm is coupled to the backside surface of the television, and wherein the first width is perpendicular to the first length and the first thickness, wherein the first width is greater than the first thickness.

2. The system of claim 1, wherein the tray is oriented horizontally and the arm protrudes vertically downward from the tray.

3. The system of claim 1, wherein the first sidewall and the second sidewall are coupled at opposite ends of the base, wherein the arm protrudes downward from the tray along a portion of the backside surface of the television.

4. The system of claim 1, further comprising a first retaining lip coupled to the first sidewall and a second retaining lip coupled to the second sidewall, wherein the first retaining lip protrudes towards the second retaining lip, and wherein the second retaining lip protrudes towards the first retaining lip.

5. A system for coupling a digital media player to a television having a topside surface, a bottomside surface that is opposite the topside surface, a backside surface, and a frontside surface, wherein the frontside surface is configurable to display images based on digital signals from the digital media player, wherein a remote control device is configured to communicate with the digital media player, the system comprising:

a tray that supports the digital media player, the tray having a frontside, a backside, and a base, wherein a first sidewall is coupled to the base and a second sidewall is coupled to the base of the tray, wherein the first sidewall and the second sidewall protrude away from the base, and wherein at least a portion of the digital media player is located between the first sidewall and the second sidewall, the tray comprising a backside opening located in the backside of the tray, wherein an electrical cable is coupled to the digital media player and the electrical cable exits the digital media player and passes through the backside opening in the backside of the tray;

an arm coupled to the tray, wherein the arm is configured to couple the tray to the television; and an adhesive coupled to the arm, wherein the adhesive is configured to couple the arm to the backside surface of the television, and wherein the adhesive is located at least partially between the arm and the backside surface of the television, wherein at least a portion of the base is located above the topside surface of the television, wherein the arm is coupled to the backside surface of the television so that the arm protrudes downward from the tray such that the tray supports the digital media player at least partially above the topside surface of the television, and wherein at least a first portion of the tray is located above the topside surface of the television while the tray supports the digital media player at least partially above the topside surface of the television.

6. A system for coupling a digital media player to a television having a topside surface, a bottomside surface that is opposite the topside surface, a backside surface, and a frontside surface, wherein the frontside surface is configurable to display images based on digital signals from the digital media player, wherein a remote control device is configured to communicate with the digital media player, the system comprising:

a tray that supports the digital media player, the tray having a frontside, a backside, and a base, wherein a first sidewall is coupled to the base and a second sidewall is coupled to the base of the tray, wherein the first sidewall and the second sidewall protrude away from the base, and wherein at least a portion of the digital media player is located between the first sidewall and the second sidewall, the tray comprising a frontside opening located in the frontside of the tray, wherein the frontside opening is capable of providing line of sight between the digital media player and the remote control device, wherein the digital media player comprises a frontside end, and the frontside opening of the tray at least partially exposes the frontside end of the digital media player, and the tray comprising a backside opening located in the backside of the tray, wherein an electrical cable is coupled to the digital media player and the electrical cable exits the digital media player and passes through the backside opening in the backside of the tray; and an arm coupled to the tray, wherein the arm is configured to couple the tray to the television, wherein at least a portion of the base is located above the topside surface of the television, wherein the arm is coupled to the backside surface of the television so that the arm protrudes downward from the tray such that the tray supports the digital media player at least partially above the topside surface of the television, and wherein at least a first portion of the tray is located above the topside surface of the television while the tray supports the digital media player at least partially above the topside surface of the television, further comprising a first retaining lip coupled to the first sidewall and a second retaining lip coupled to the second sidewall, wherein the first retaining lip protrudes towards the second retaining lip, and wherein the second retaining lip protrudes towards the first retaining lip, wherein the base is located below the first retaining lip and the second retaining lip, wherein the first sidewall protrudes upward from the base away from the topside surface of the television to couple the base to the first retaining lip, and wherein the second sidewall protrudes upward from the base away from the topside surface of the television to couple the base to the second retaining lip.

7. The system of claim 6, wherein the tray further comprises a retention wall coupled to a front portion of the tray and the retention wall is configured to hold the digital media player at least partially inside the tray, and wherein a cantilever beam couples the retention wall to the base and the cantilever beam is configured to flex to enable the retention wall to move relative to the base during insertion of the digital media player into the tray.

8. The system of claim 1, wherein the tray further comprises a retention wall coupled to a front portion of the tray, wherein the retention wall is configured to hold the digital media player at least partially inside the tray, wherein at least a section of the digital media player is held between the retention wall, the first sidewall, and the second sidewall.

9. The system of claim 8, wherein a cantilever beam couples the retention wall to the base, wherein the cantilever beam is configured to flex to enable the retention wall to move relative to the base during insertion of the digital media player into the tray.

10. The system of claim 9, wherein the retention wall is oriented within plus or minus 20 degrees of perpendicular to the cantilever beam.

11. A system for coupling a digital media player to a television having a topside surface, a bottomside surface that is opposite the topside surface, a backside surface, and a frontside surface, wherein the frontside surface is configurable to display images based on digital signals from the digital media player, wherein a remote control device is configured to communicate with the digital media player, the system comprising:

a tray that supports the digital media player, the tray having a frontside, a backside, and a base, wherein a first sidewall is coupled to the base and a second sidewall is coupled to the base of the tray, wherein the first sidewall and the second sidewall protrude away from the base, and wherein at least a portion of the digital media player is located between the first sidewall and the second sidewall, the tray comprising a backside opening located in the backside of the tray, wherein an electrical cable is coupled to the digital media player and the electrical cable exits the digital media player and passes through the backside opening in the backside of the tray; and an arm coupled to the tray, wherein the arm is configured to couple the tray to the television, wherein at least a portion of the base is located above the topside surface of the television, wherein the arm is coupled to the backside surface of the television so that the arm protrudes downward from the tray such that the tray supports the digital media player at least partially above the topside surface of the television, and wherein at least a first portion of the tray is located above the topside surface of the television while the tray supports the digital media player at least partially above the topside surface of the television wherein the tray comprises a slide channel oriented from a front portion of the tray to a back portion of the tray, wherein the arm is movably coupled to the slide channel of the tray such that the arm is configured to move from the front portion of the tray to the back portion of the tray.

12. The system of claim 11, wherein the slide channel comprises teeth configured to inhibit movement of the arm along the slide channel, wherein the arm is coupled to the slide channel such that a first protrusion faces at least one of the teeth, wherein the teeth are configured to engage the first protrusion to inhibit the movement, and wherein a pivot couples the arm to the slide channel such that the arm is configured to pivot relative to the tray.

13. The system of claim 12, wherein the slide channel comprises parallel opposing walls, and the teeth are located on the parallel opposing walls.

14. The system of claim 11, further comprising an adhesive coupled to the arm, wherein the adhesive is configured to couple the arm to the backside surface of the television, and wherein the adhesive is located at least partially between the arm and the backside surface of the television, wherein the arm comprises a first section and a second section slidably coupled to the first section, wherein the second section is coupled to the adhesive, and the first section is coupled to the tray such that the arm is configured to elongate to adjust an extension length of the arm.

15. The system of claim 11, further comprising an adhesive coupled to the arm, wherein the adhesive is configured to couple the arm to the backside surface of the television, and wherein the adhesive is located at least partially between the arm and the backside surface of the television, wherein a pivot couples the arm to the slide channel such that the arm is configured to pivot relative to the tray, wherein the arm comprises a first section and a second section slidably coupled to the first section such that the arm is configured to elongate to adjust an extension length of the arm, wherein the second section couples the first section to the adhesive, and the first section couples the second section to the pivot.

16. The system of claim 1, wherein a first pivot couples the arm to the tray such that the arm is configured to pivot relative to the base, and the first pivot is oriented to enable the arm to rotate in a direction from the frontside of the tray to the backside of the tray.

17. The system of claim 16, wherein the first pivot comprises at least one tooth and a first cylindrical portion, wherein the first cylindrical portion comprises at least one protrusion facing the tooth, and wherein the tooth is configured to engage the protrusion of the cylindrical portion.

18. The system of claim 1, further comprising an adhesive coupled to the arm, wherein the adhesive is configured to couple the arm to the backside surface of the television, and wherein the adhesive is located at least partially between the arm and the backside surface of the television.

19. The system of claim 18, wherein the arm comprises a first section and a second section slidably coupled to the first section such that the arm is configured to elongate to adjust an extension length of the arm, wherein the adhesive is coupled to the second section, and the first section is coupled to the tray, wherein the arm comprises at least one slot and a snap member configured to engage the at least one slot to lock the extension length of the arm.

20. The system of claim 18, wherein the arm comprises a first section and a second section slidably coupled to the first section such that the arm is configured to elongate to adjust an extension length of the arm, wherein the adhesive is coupled to the second section, and the first section is coupled to the tray, wherein a pivot couples the first section to the tray such that the arm is configured to pivot relative to the base, wherein the pivot is oriented to enable the arm to rotate in a direction from the frontside of the tray to the backside of the tray.

21. The system of claim 5,
wherein the first sidewall protrudes upward from the base away from the topside surface of the television, and wherein the second sidewall protrudes upward from the base away from the topside surface of the television, the tray comprising:
a retention wall coupled to a front portion of the tray, wherein the retention wall protrudes upward from the base away from the topside surface of the television, wherein the retention wall is configured to hold the digital media player at least partially inside the tray, wherein at least a section of the digital media player is held between the retention wall, the first sidewall, and the second sidewall.

22. The system of claim 5, wherein a pivot couples the arm to the tray such that the arm is configured to pivot relative to the base, and the pivot is oriented to enable the arm to rotate in a direction from the frontside of the tray to the backside of the tray.

23. The system of claim 11, further comprising an adhesive coupled to the arm, wherein the adhesive is configured to couple the arm to the backside surface of the television, and wherein the adhesive is located at least partially between the arm and the backside surface of the television.

24. The system of claim 5, wherein the tray comprises a slide channel oriented from a front portion of the tray to a back portion of the tray, and wherein the arm is coupled to the slide channel such that the arm is configured to move towards the frontside of the tray and towards the backside of the tray.

25. The system of claim 6, further comprising an adhesive coupled to the arm, wherein the adhesive is configured to couple the arm to the backside surface of the television, wherein a pivot couples the arm to the tray such that the arm is configured to pivot relative to the tray and such that the pivot is configured to adjust an orientation of the adhesive in a direction from the frontside of the tray to the backside of the tray.

26. The system of claim 18, wherein the arm comprises a first section and a second section slidably coupled to the first section, wherein the arm is configured such that an extension length of the arm adjusts when the second section slides with respect to the first section, and wherein the adhesive is coupled to the second section.

27. The system of claim 5, the tray comprising a frontside opening located in the frontside of the tray, wherein the frontside opening is capable of providing line of sight between the digital media player and the remote control device, wherein the digital media player comprises a frontside end, and the frontside opening of the tray at least partially exposes the frontside end of the digital media player.

28. The system of claim 11, the tray comprising a frontside opening located in the frontside of the tray, wherein the frontside opening is capable of providing line of sight between the digital media player and the remote control device, wherein the digital media player comprises a frontside end, and the frontside opening of the tray at least partially exposes the frontside end of the digital media player.

29. The system of claim 1, wherein the tray comprises a slide channel oriented from a front portion of the tray to a back portion of the tray, wherein the arm is movably coupled to the slide channel of the tray such that the arm is configured to move from the front portion of the tray to the back portion of the tray.

30. The system of claim 11, wherein the tray further comprises a retention wall coupled to a front portion of the tray, wherein the retention wall is configured to hold the digital media player at least partially inside the tray, wherein at least a section of the digital media player is held between the retention wall, the first sidewall, and the second sidewall.

\* \* \* \* \*